US012302806B1

(12) United States Patent
Feist

(10) Patent No.: US 12,302,806 B1
(45) Date of Patent: May 20, 2025

(54) AGRICULTURAL GROW SYSTEM TO PROPAGATE SEEDLINGS

(71) Applicant: Larry Feist, Pinckney, MI (US)

(72) Inventor: Larry Feist, Pinckney, MI (US)

( * ) Notice: Subject to any disclaimer, the term of this patent is extended or adjusted under 35 U.S.C. 154(b) by 0 days.

(21) Appl. No.: 18/211,630

(22) Filed: Jun. 20, 2023

Related U.S. Application Data

(60) Provisional application No. 63/353,762, filed on Jun. 20, 2022.

(51) Int. Cl.
*A01G 31/02* (2006.01)

(52) U.S. Cl.
CPC .................................... *A01G 31/02* (2013.01)

(58) Field of Classification Search
CPC ........ A01G 31/00; A01G 31/02; A01K 31/00; A01K 31/02
See application file for complete search history.

(56) References Cited

U.S. PATENT DOCUMENTS

| | | | | |
|---|---|---|---|---|
| 4,175,354 | A * | 11/1979 | Anderson | A01G 27/006 211/1.51 |
| 4,407,092 | A * | 10/1983 | Ware | A01G 31/02 47/64 |
| 6,219,968 | B1 * | 4/2001 | Belger | C09K 17/52 47/64 |
| 8,458,955 | B2 * | 6/2013 | Larsen | A01C 1/04 47/65.5 |
| 9,374,952 | B1 * | 6/2016 | Cross | A01G 31/047 |
| 11,849,681 | B1 * | 12/2023 | Allgeier | A01G 9/023 |
| 2016/0014986 | A1 * | 1/2016 | Vande Vrede | A01G 31/00 47/59 R |
| 2018/0317409 | A1 * | 11/2018 | Staffeldt | A01G 31/02 |
| 2019/0320605 | A1 * | 10/2019 | Buj | A01G 9/16 |
| 2020/0037514 | A1 * | 2/2020 | Massey | A01G 9/24 |
| 2020/0093080 | A1 * | 3/2020 | Grifa | A01G 7/045 |
| 2020/0236864 | A1 * | 7/2020 | Henry | A01G 27/003 |
| 2020/0352112 | A1 * | 11/2020 | Hunter | A01G 31/06 |
| 2021/0176935 | A1 * | 6/2021 | Massey | A01G 31/06 |
| 2022/0142067 | A1 * | 5/2022 | Chernov | A01G 9/20 |
| 2022/0174890 | A1 * | 6/2022 | Wantland | A01G 31/047 |

(Continued)

FOREIGN PATENT DOCUMENTS

| | | | | | |
|---|---|---|---|---|---|
| CN | 109452038 | A | * | 3/2019 | A01G 31/02 |
| CN | 109496821 | A | * | 3/2019 | A01G 31/02 |

(Continued)

*Primary Examiner* — Monica L Perry
*Assistant Examiner* — Aaron M Rodziwicz
(74) *Attorney, Agent, or Firm* — John Rizvi; John Rizvi, P.A.—The Patent Professor ®

(57) ABSTRACT

An agricultural grow system for propagating seedlings in both aeroponic and deep-water culture environments without the use of commercial growing media. The agricultural grow system comprises a lower base shell and an upper shell having a plurality of plant sites positioned about a lower edge of the upper shell. The agricultural grow system also comprises a plurality of seedling inserts positioned in the plurality of plant sites of the upper shell and a plumbing system extending from the lower base shell to the upper shell, wherein the plumbing system comprising a spray line connected to a source of water and a spray head connected to the spray line, and wherein the spray head is positioned to supply the water to the plurality of seedling inserts.

18 Claims, 25 Drawing Sheets

(56) References Cited

U.S. PATENT DOCUMENTS

Figure 1:
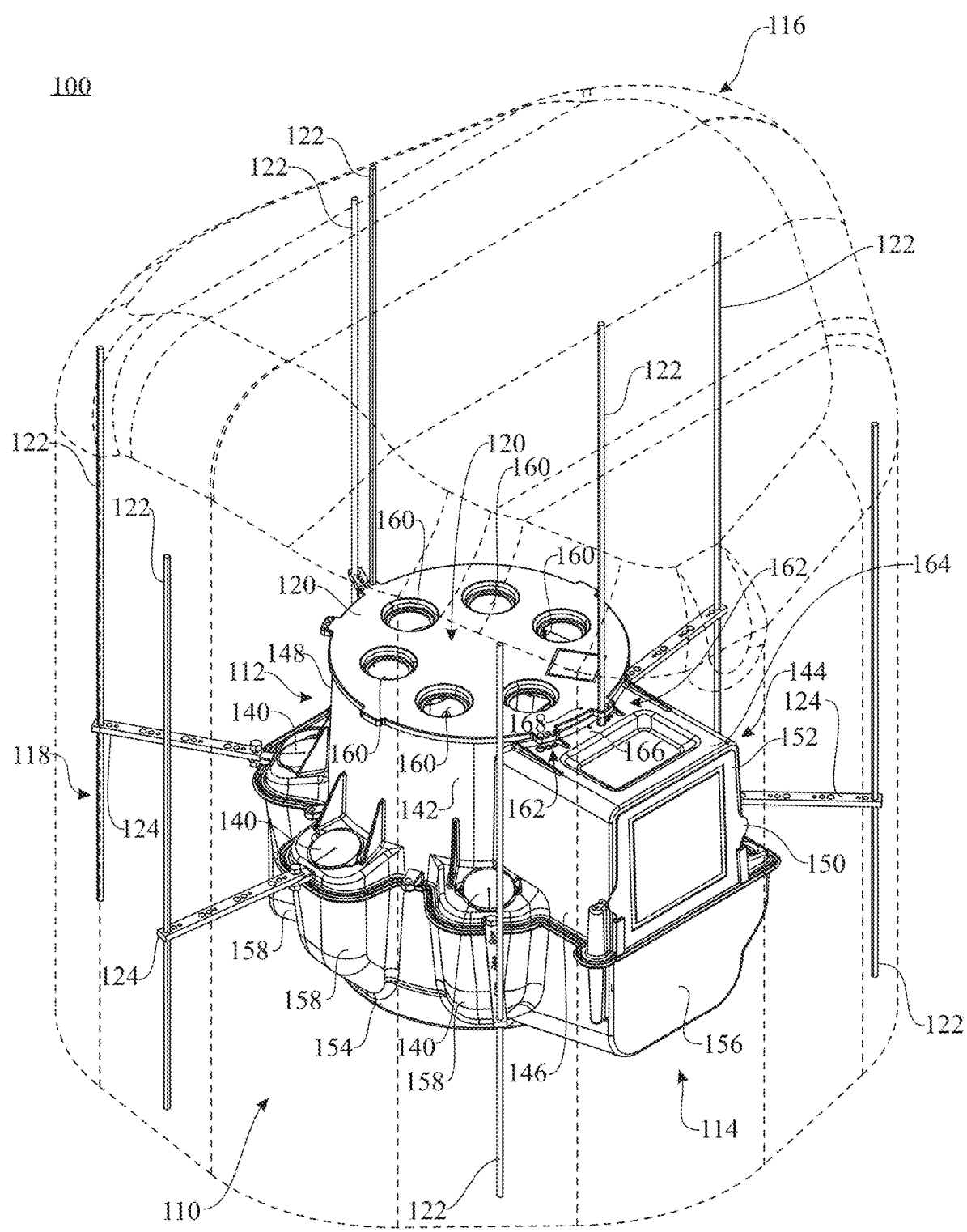

| | | | |
|---|---|---|---|
| 2022/0174898 A1* | 6/2022 | Allgeier | A01G 31/06 |
| 2022/0386544 A1* | 12/2022 | An | A61L 2/24 |
| 2022/0408671 A1* | 12/2022 | Vijayan | A01G 31/02 |
| 2023/0014191 A1* | 1/2023 | Wantland | B08B 3/08 |
| 2023/0084525 A1* | 3/2023 | Massey | A01G 9/0293 |
| | | | 47/60 |
| 2023/0148484 A1* | 5/2023 | Gardner | A01G 31/06 |
| | | | 47/65 |
| 2023/0301241 A1* | 9/2023 | Maddocks | A01G 9/02 |

FOREIGN PATENT DOCUMENTS

| | | | | |
|---|---|---|---|---|
| CN | 109496822 A | * | 3/2019 | A01G 31/02 |
| CN | 112690149 A | * | 4/2021 | A01G 7/045 |
| CN | 113068601 A | * | 7/2021 | A01G 31/02 |
| CN | 114080978 A | * | 2/2022 | |
| CN | 115589977 A | * | 1/2023 | |
| CN | 117426295 A | * | 1/2024 | |
| CN | 117441604 A | * | 1/2024 | |
| CN | 117546771 A | * | 2/2024 | |
| WO | WO-2016164652 A1 | * | 10/2016 | A01G 31/00 |
| WO | WO-2018068042 A1 | * | 4/2018 | A01G 31/02 |
| WO | WO-2018145199 A2 | * | 8/2018 | A01G 31/02 |
| WO | WO-2024147818 A1 | * | 7/2024 | |

\* cited by examiner

AGRICULTURAL GROW SYSTEM TO PROPAGATE SEEDLINGS

CROSS-REFERENCE TO RELATED APPLICATIONS

This application claims the benefit of U.S. Provisional Patent Application Ser. No. 63/353,762 filed on Jun. 20, 2022, which is incorporated by reference herein in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

Not Applicable

BACKGROUND OF THE INVENTION

Field of the Invention

The present invention relates generally to plant seedling propagation, and more particularly, to an agricultural grow system for propagating seedlings in aeroponic and deep-water culture environments.

Description Of Related Art Including Information Disclosed Under 3 7 CPR 1.97 And 1.98

Propagating plant seeds into seedlings is both an individual and commercial activity that requires maintaining the seeds in a proper environment to prevent the seeds, and any roots springing therefrom, from drying out and killing the seedlings.

One of the more common ways of propagating seedlings is to bury the seeds in a commercial growth medium. The growth medium is watered and the seedlings absorb the water from the growth medium in order to grow.

More recent advances in propagating seedlings, called aeroponic propagation, incorporates spraying water directly onto tap roots of the seedlings. Another method called deep-water culture keeps the tap roots of the seedlings immersed in the water as the seedlings are growing. The current technologies for performing both aeroponic propagation and deep-water culture propagation are limited in size and the amount of seedlings that can be propagated in a single device.

Furthermore, the current systems limit the length of time a plant can remain in the system. The current systems additionally limit the amount or size of roots that can be accommodated. This is further exacerbated by the limited space covered by typical growing lamps. These lamps cover approximately a four to five foot box shaped area. The current systems are limited in the amount plants that can be propagated within that area.

Accordingly, there is a need for a solution that can overcome one or more above mentioned challenges. For example, there is an established need for an agricultural grow system that can propagate a large number of seedlings in both aeroponic and deep-water culture methods.

BRIEF SUMMARY OF THE INVENTION

According to an implementation of the present specification, there is provided an agricultural grow system for propagating seedlings, the grow system comprising: a lower base shell; an upper shell having a plurality of plant sites positioned about a lower edge of the upper shell; a plurality of seedling inserts positioned in the plurality of plant sites of the upper shell; and a plumbing system extending from the lower base shell to the upper shell, wherein the plumbing system comprises a spray line connected to a source of water and a spray head connected to the spray line, and wherein the spray head is positioned to supply the water to the plurality of seedling inserts.

In an aspect, the spray line may be a first spray line, and the spray head may be a first spray head, and the plumbing system may further comprise a second spray line connected to the source of water and a second spray head connected to the second spray line.

In an aspect, the first spray head and the second spray head may be positioned within an interior chamber of the upper shell.

In an aspect, the first spray head may be positioned in the upper shell and the second spray head may be positioned in the lower shell, wherein the first spray head and the second spray head may be positioned on a common center axis of the upper shell and the lower shell.

In an aspect, the agricultural grow system may further comprise an insert bucket positionable within an interior chamber of the upper shell, wherein the insert bucket may comprise a cylindrical wall, a closed bottom, and an open top, and wherein the cylindrical wall may comprise slits extending downward from an upper edge of the insert bucket to define a maximum fill level in the insert bucket.

In an aspect, the insert bucket may comprise a bore channel that extends upward within the interior chamber, wherein the bore channel may be configured to receive the spray line and the spray head, and wherein the insert bucket may further comprise a plurality of partitions to allow individual roots of at least one seedling placed in each of the plurality of plant sites to propagate.

In an aspect, the agricultural grow system may further comprise a dolly having a base and a plurality of wheels, wherein the dolly may be placed below the lower base shell to move the agriculture grow system.

According to another implementation of the present specification, there is provided an agricultural grow system for propagating seedlings, the grow system comprising: a revolver having an upper shell and a lower base shell removably resting on the upper shell; a containment cover positioned around the revolver; a plurality of seedling inserts removably inserted into the revolver, and a plumbing system placed in the revolver, wherein the plumbing system is configured to supply water to at least one seedling placed in each of the plurality of seedling inserts.

In an aspect, the revolver may further comprise a lid module removably positioned on the upper shell, wherein the lid module may comprise at least one sleeve extending downward, and wherein the at least one sleeve has at least one deflector plate.

In an aspect, the at least one deflector plate may be configured to deflect the water sprayed onto the at least one deflector plate using the plumbing system and direct the water to the at least one seedling.

In an aspect, each of the plurality of the seedling inserts may comprise a cylindrical body portion having a top portion, a side portion, and a bottom portion.

In an aspect, the cylindrical body portion may have a V-shaped notch, wherein the V-shaped notch extends at least through one of the top, side, and bottom portions of the cylindrical body portion, and wherein the cylindrical body portion may further has a seedling hole at an apex of the V-shaped notch for receipt of the at least one seedling.

In an aspect, the cylindrical body portion may have a partial bore extending upward from the bottom portion to a seedling hole at a top of the partial bore, wherein a shape of the partial bore may be one of a conical, a cylindrical, an oval, a rectangular, and a square shape.

In an aspect, at least one of the lid module and the upper shell may be provided with one or more stake hole series to receive one or more support stakes.

In an aspect, the one or more support stakes may enable at least one of vertical movement and rotational movement of the at least one of the lid module and the upper shell relative to the lower base shell.

According to an implementation of the present specification, there is provided a revolver device of an agricultural grow system for propagating seedlings, the revolver device comprising: an upper shell; a lower base shell removably resting on the upper shell; and a plurality of plant sites on the upper shell of the revolver, wherein the upper shell comprises a cylindrical body portion and a rectangular nose portion extending outwards from the cylindrical body portion, and wherein the lower base shell comprises a bowl and a rectangular nose extending from the bowl.

In an aspect, the bowl may be provided with a plurality of plant site troughs positioned below the plurality of plant sites.

In an aspect, the plurality of plant sites is a plurality of lower plant sites, wherein each of the plurality of lower plant sites may extend outward from a lower edge of the cylindrical body portion.

In an aspect, the revolver may further comprise a lid module removably attached to an upper edge of the cylindrical body portion of the upper shell, wherein the lid module may be provided with a plurality of upper plant sites.

In an aspect, the revolver may further comprise a sealing curtain extending around at least a portion of interiors of the upper shell and the lower base shell to provide a seal between the upper shell and the lower base shell.

The agriculture grow system and the revolver device of the present disclosure overcome one or more shortcomings of the prior art. Additional features and advantages may be realized through the techniques of the present disclosure. Other embodiments and aspects of the disclosure are described in detail herein and are considered a part of the claimed disclosure.

These and other objects, features, and advantages of the present invention will become more readily apparent from the attached drawings and the detailed description of the preferred embodiments, which follow.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Furthermore, the particular shapes of the elements as drawn are not necessarily intended to convey any information regarding the actual shape of the particular elements and have been solely selected for ease of recognition in the drawings.

Figure 2:
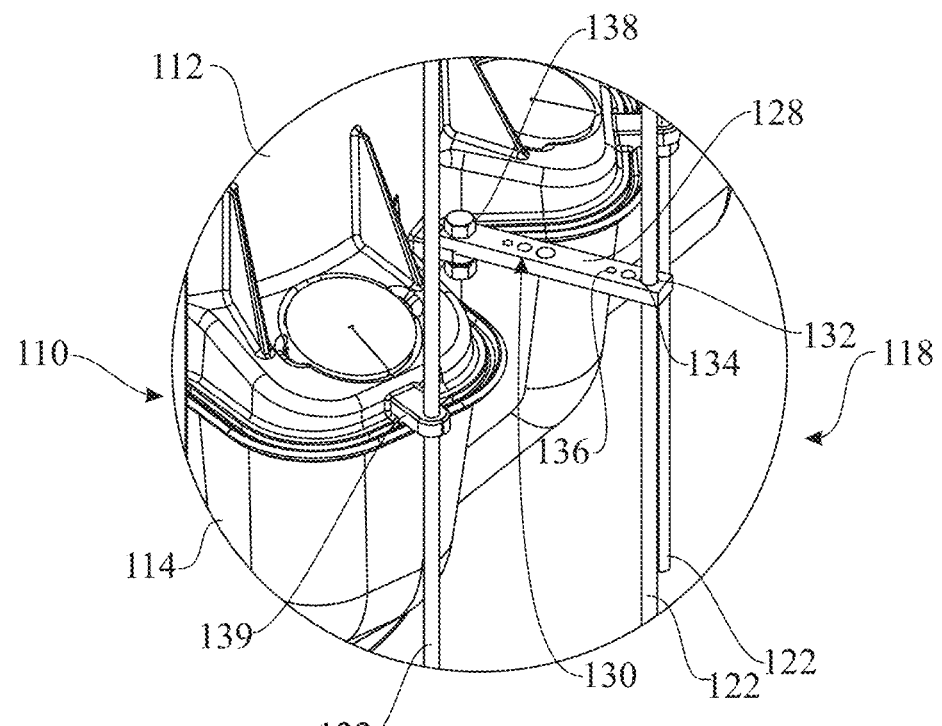
Figure 3:
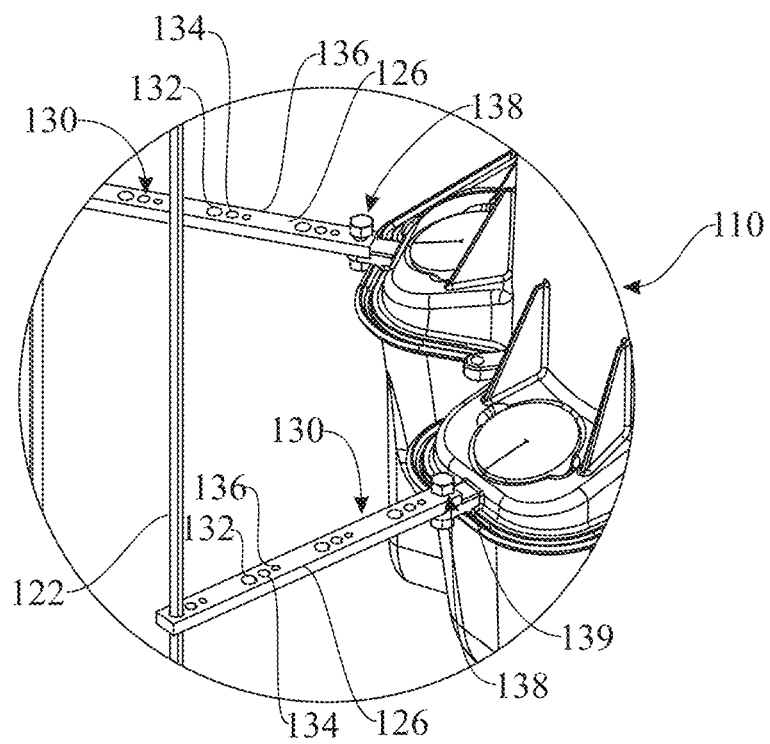
Figure 4:
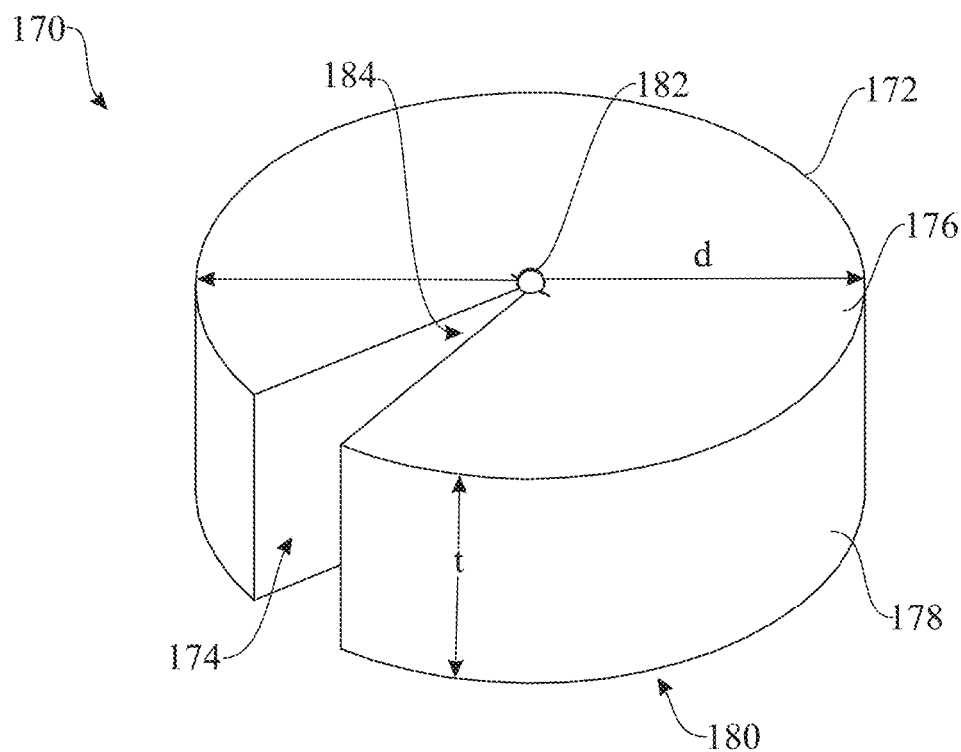
Figure 5:
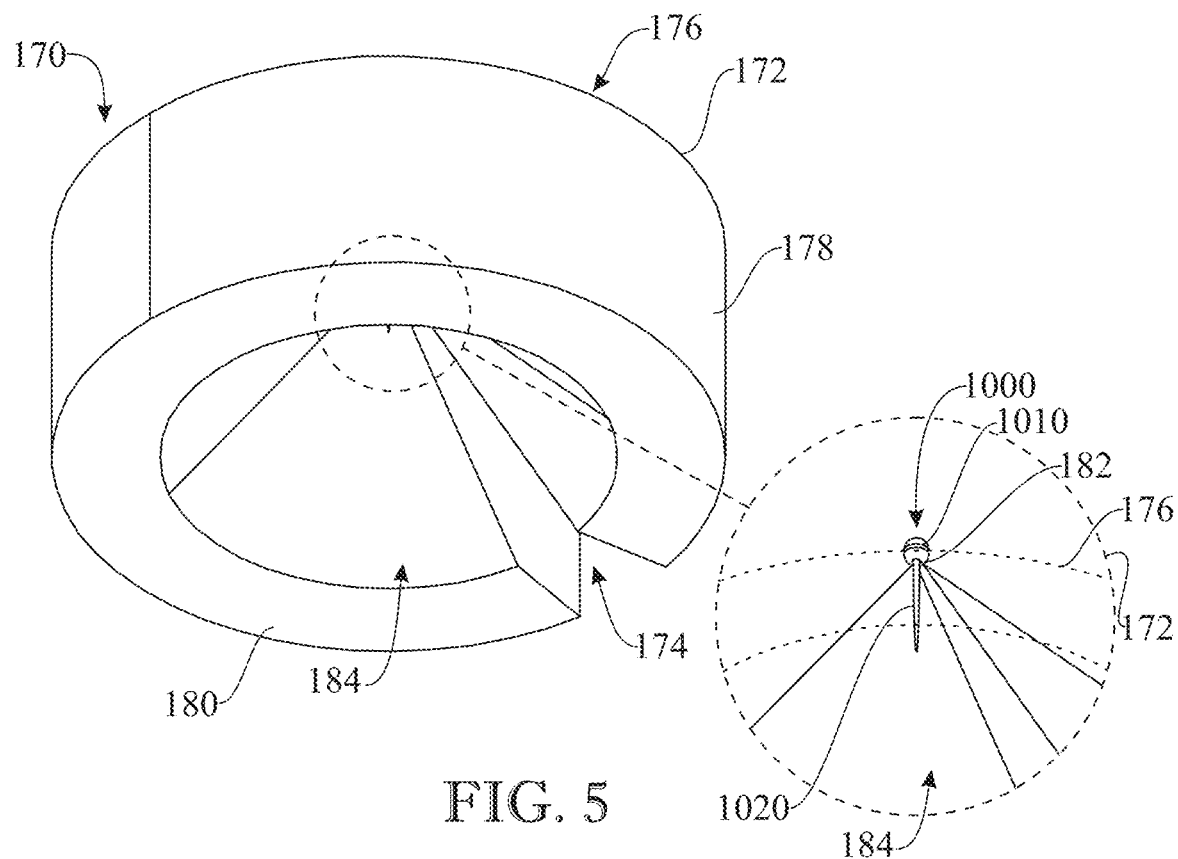
Figure 6:
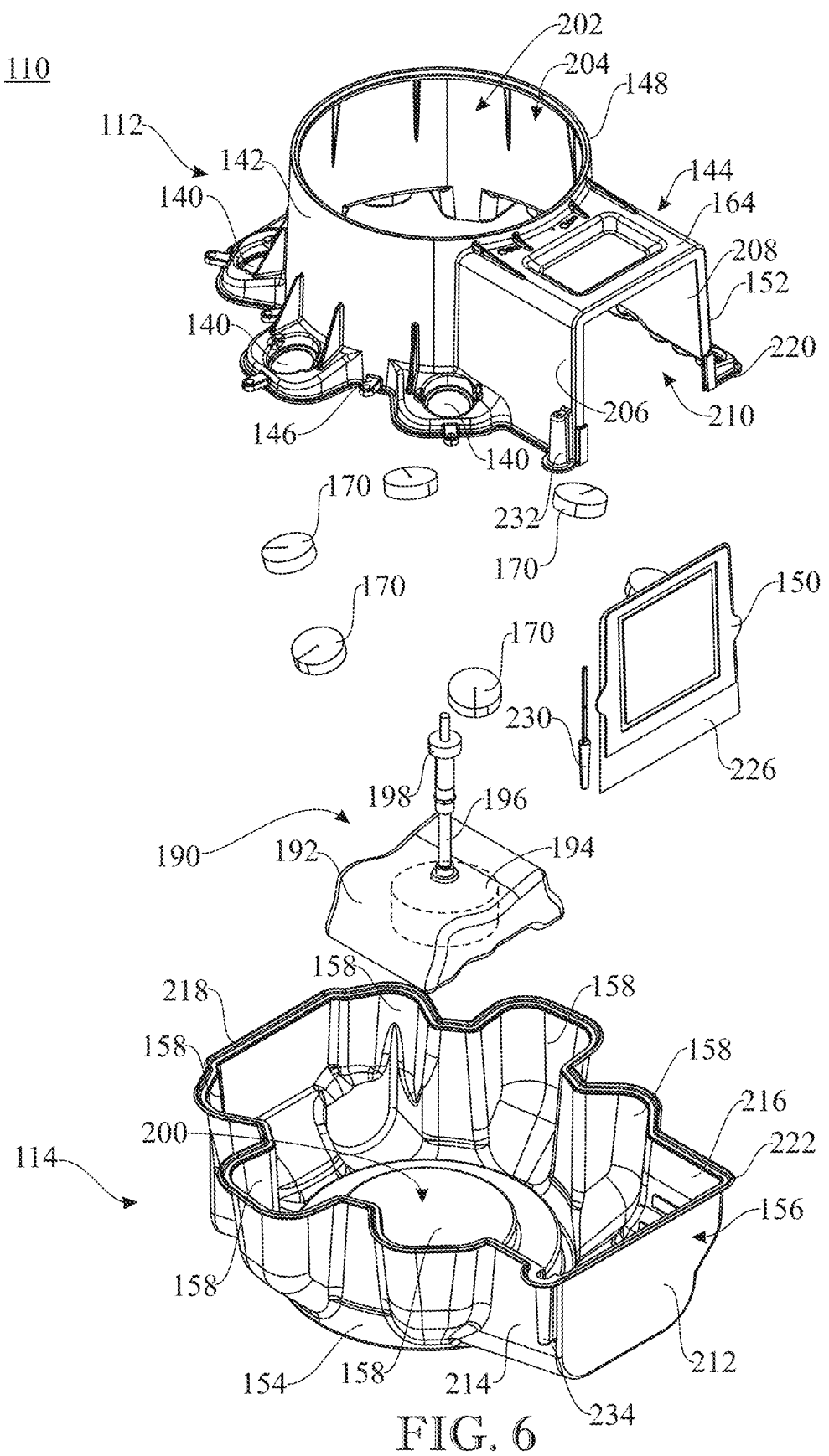
Figure 7:
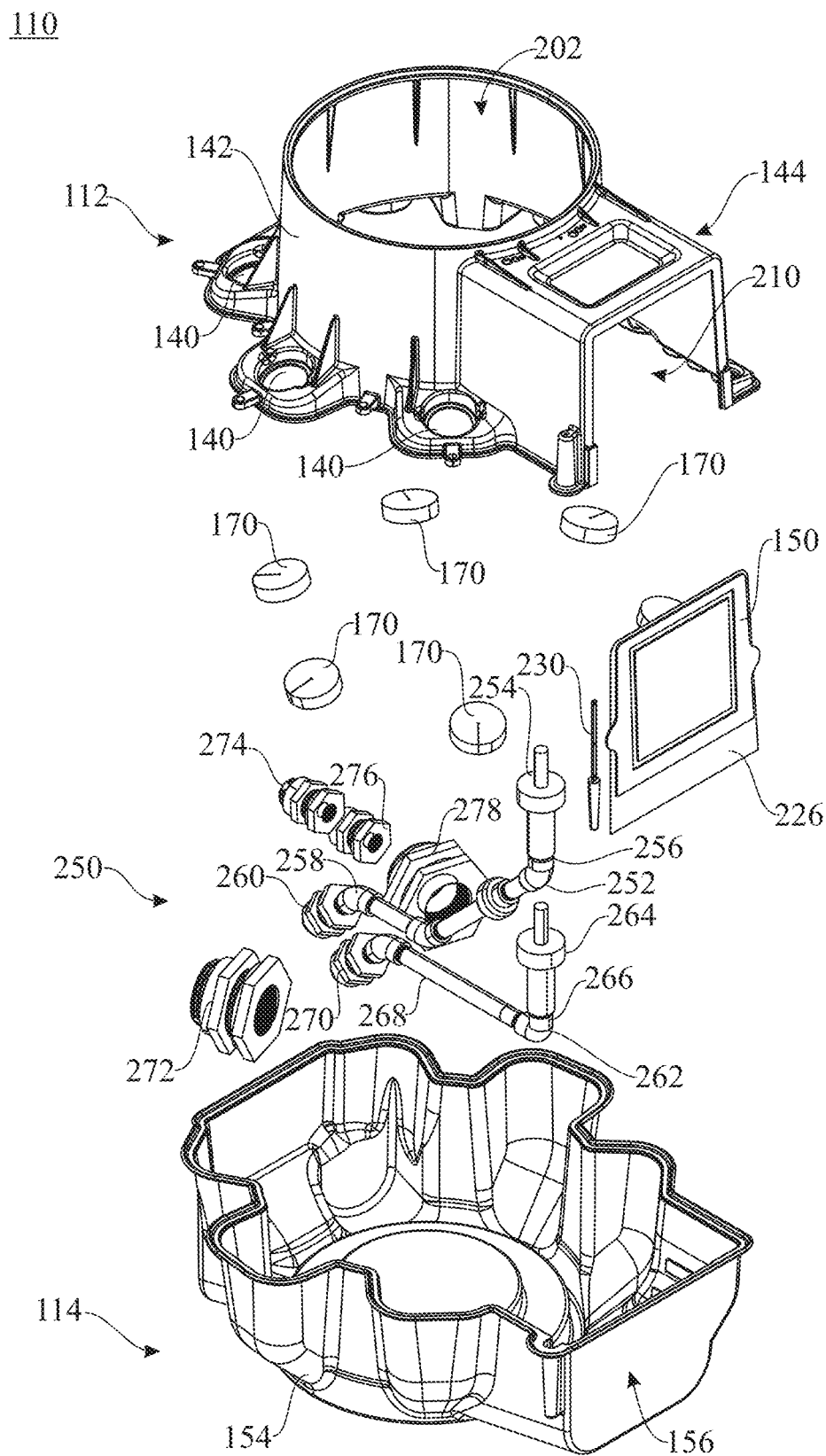
Figure 8:
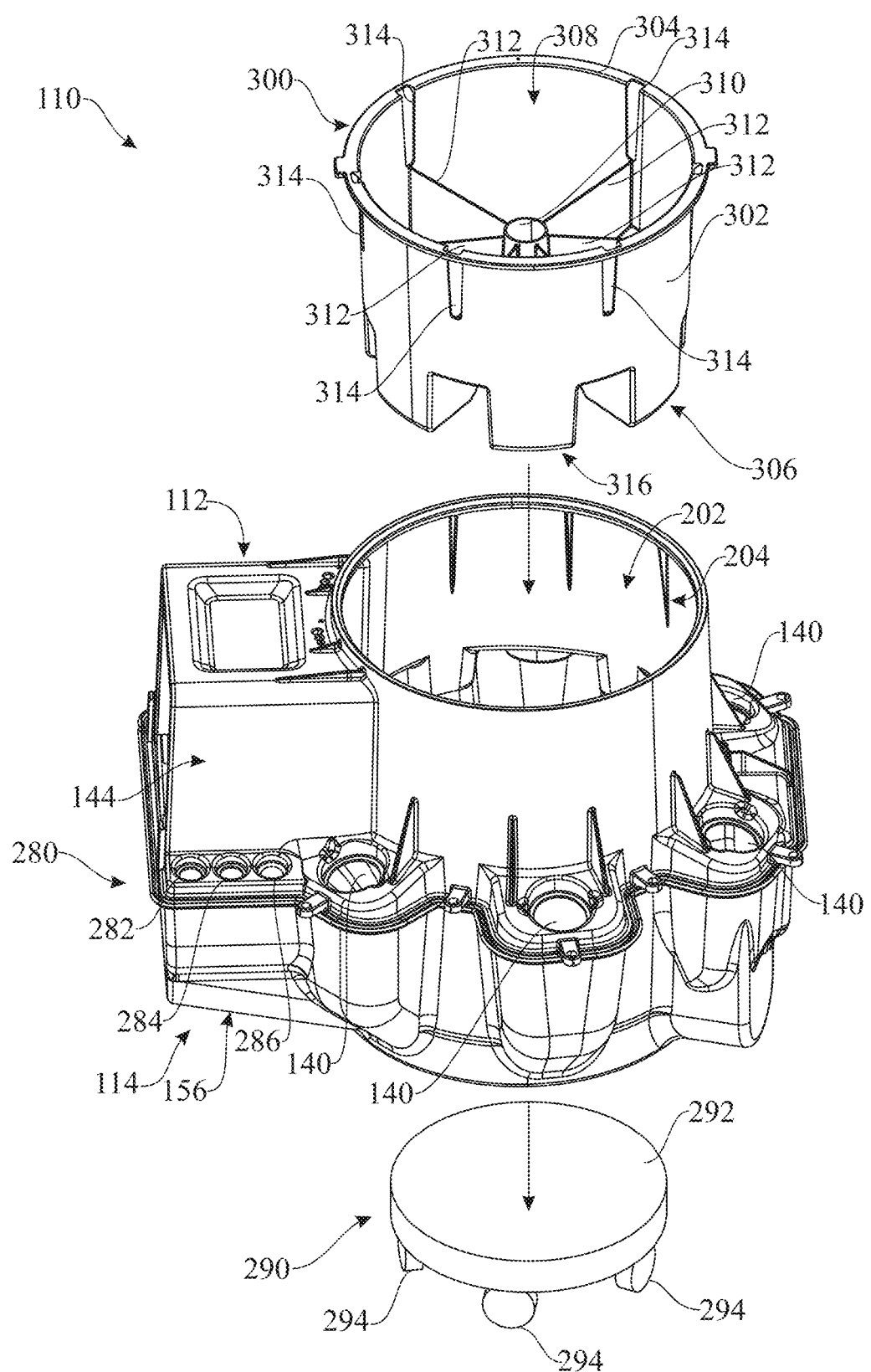
Figure 9:
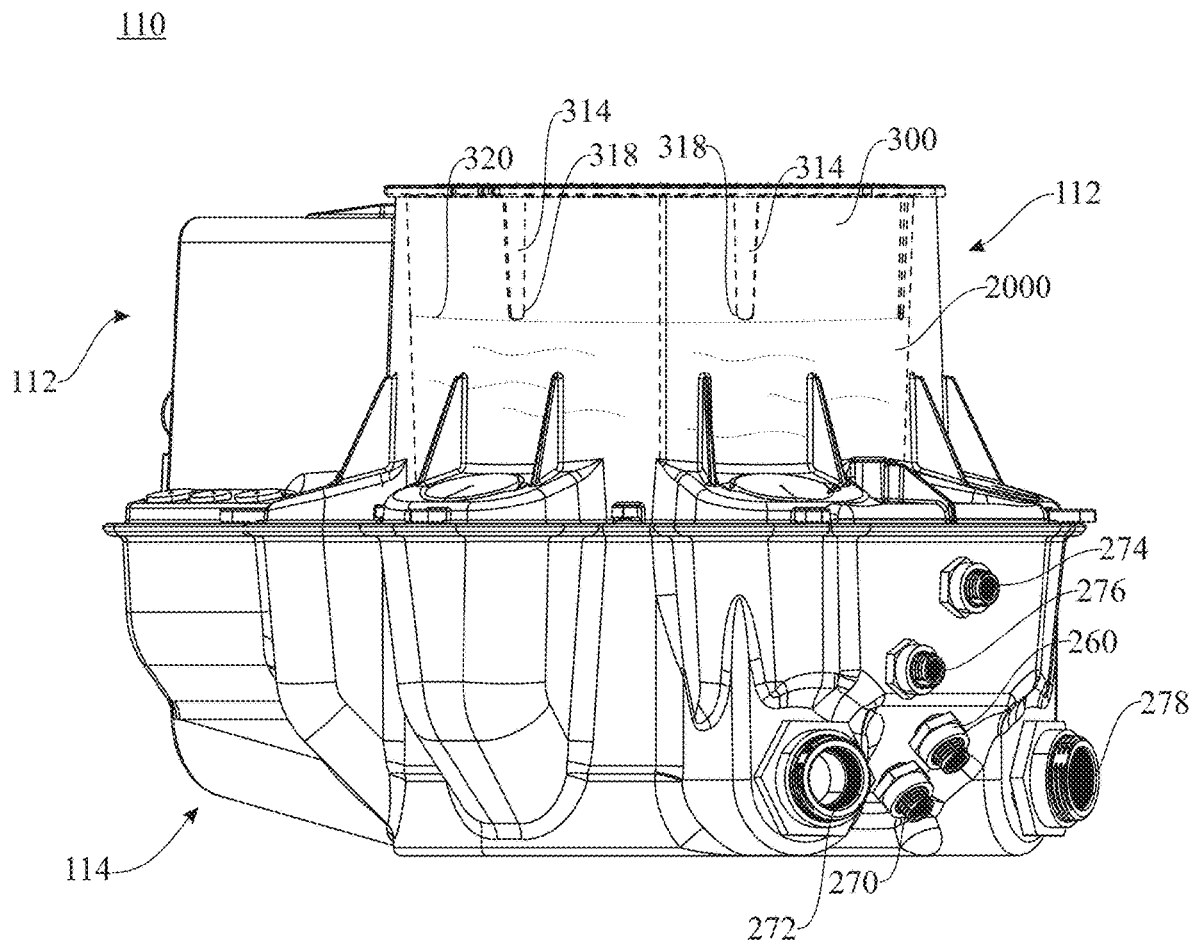
Figure 10:
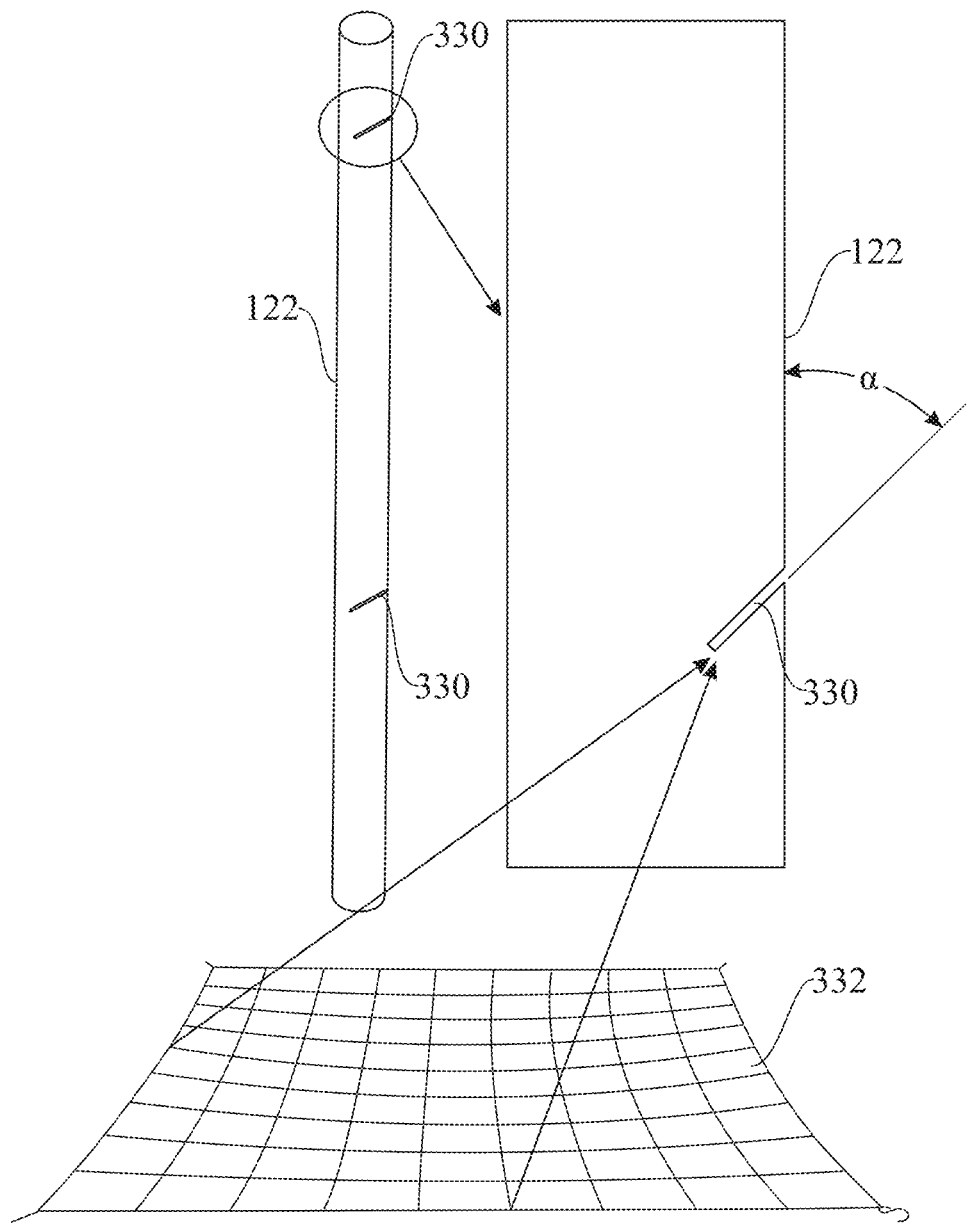
Figure 11:
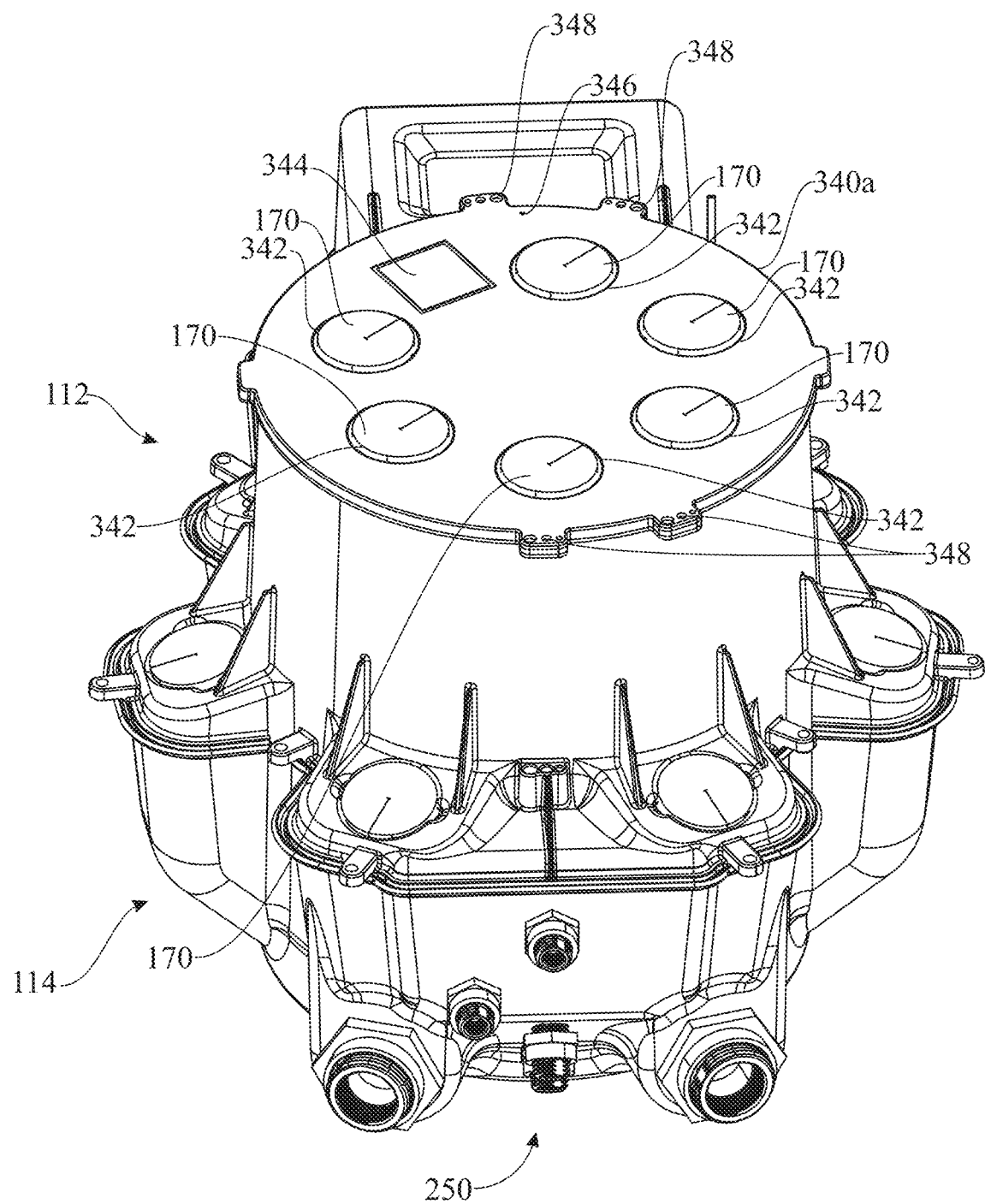
Figure 12A:
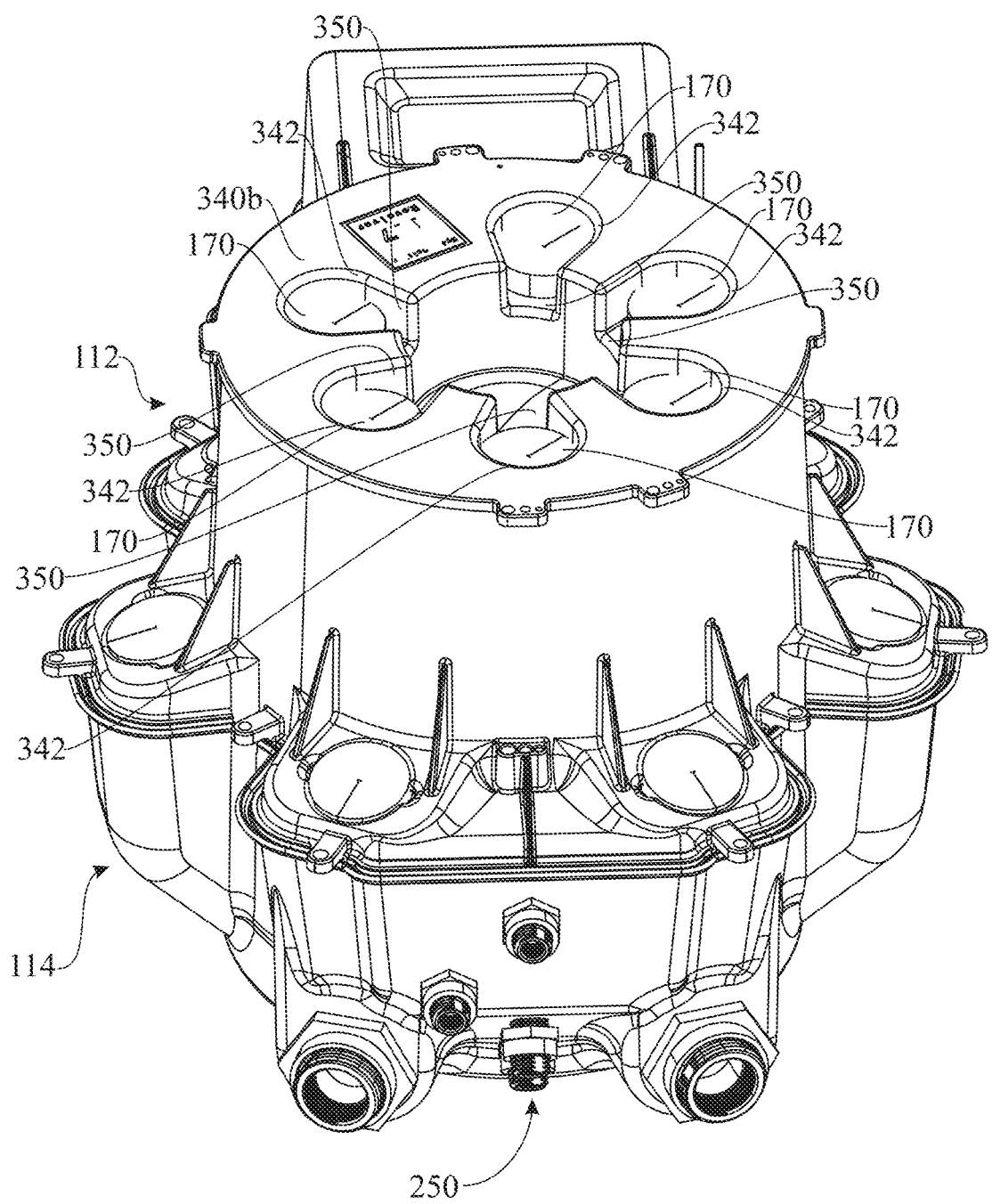
Figure 12B:
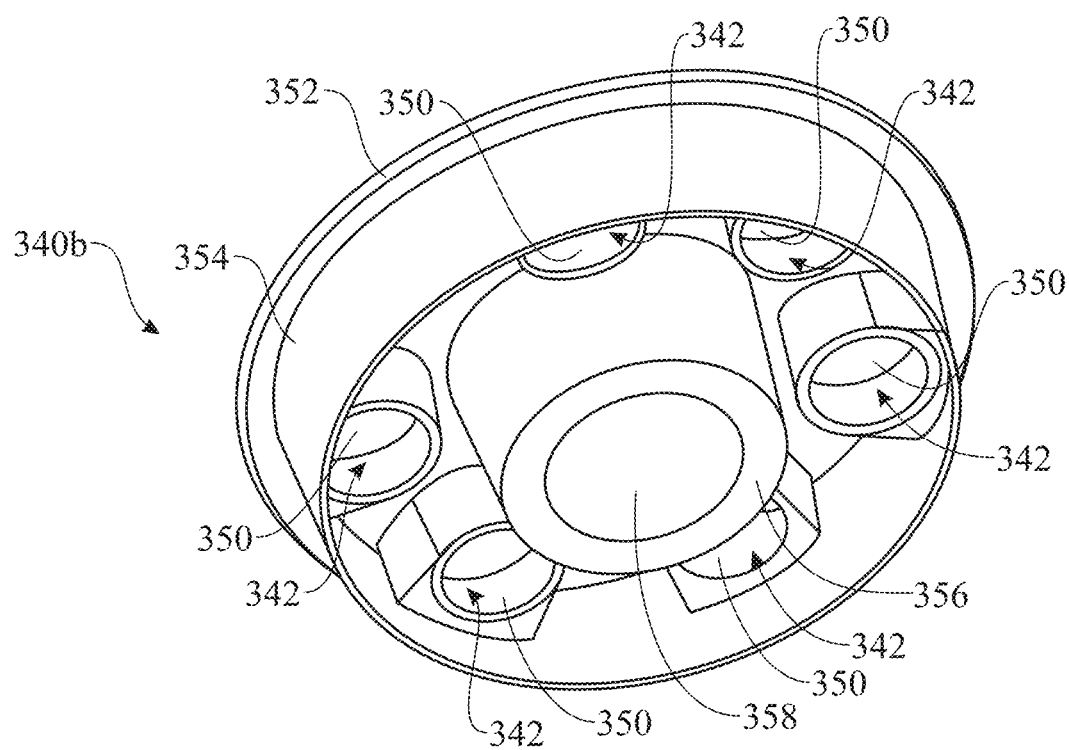
Figure 12C:
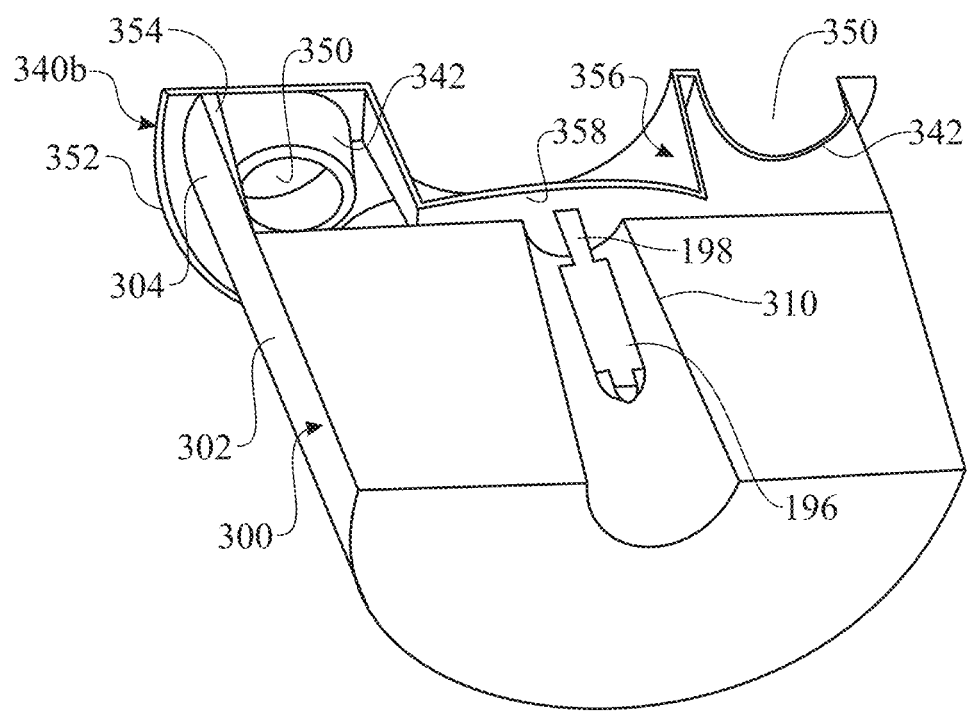
Figure 13:
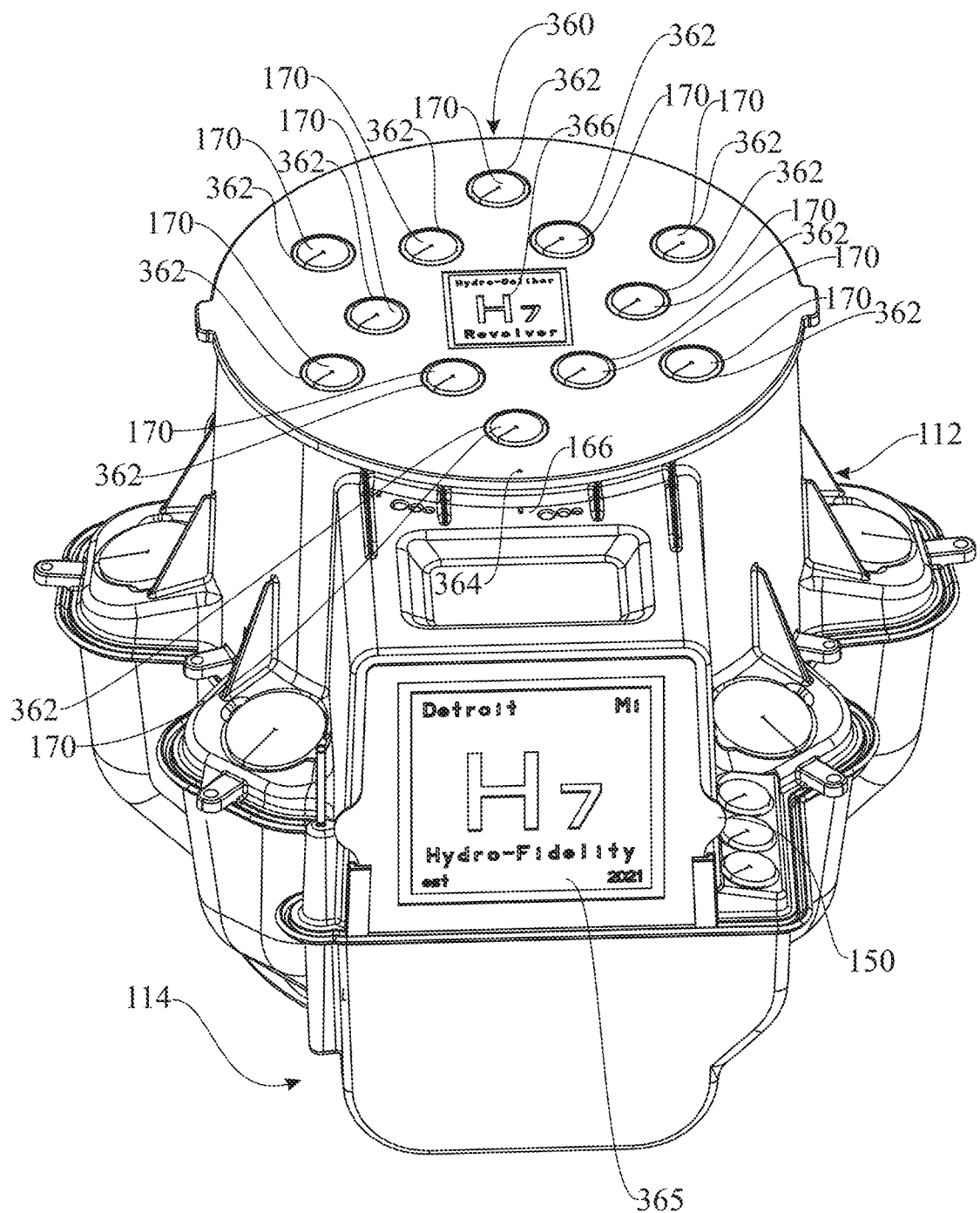
Figure 14:
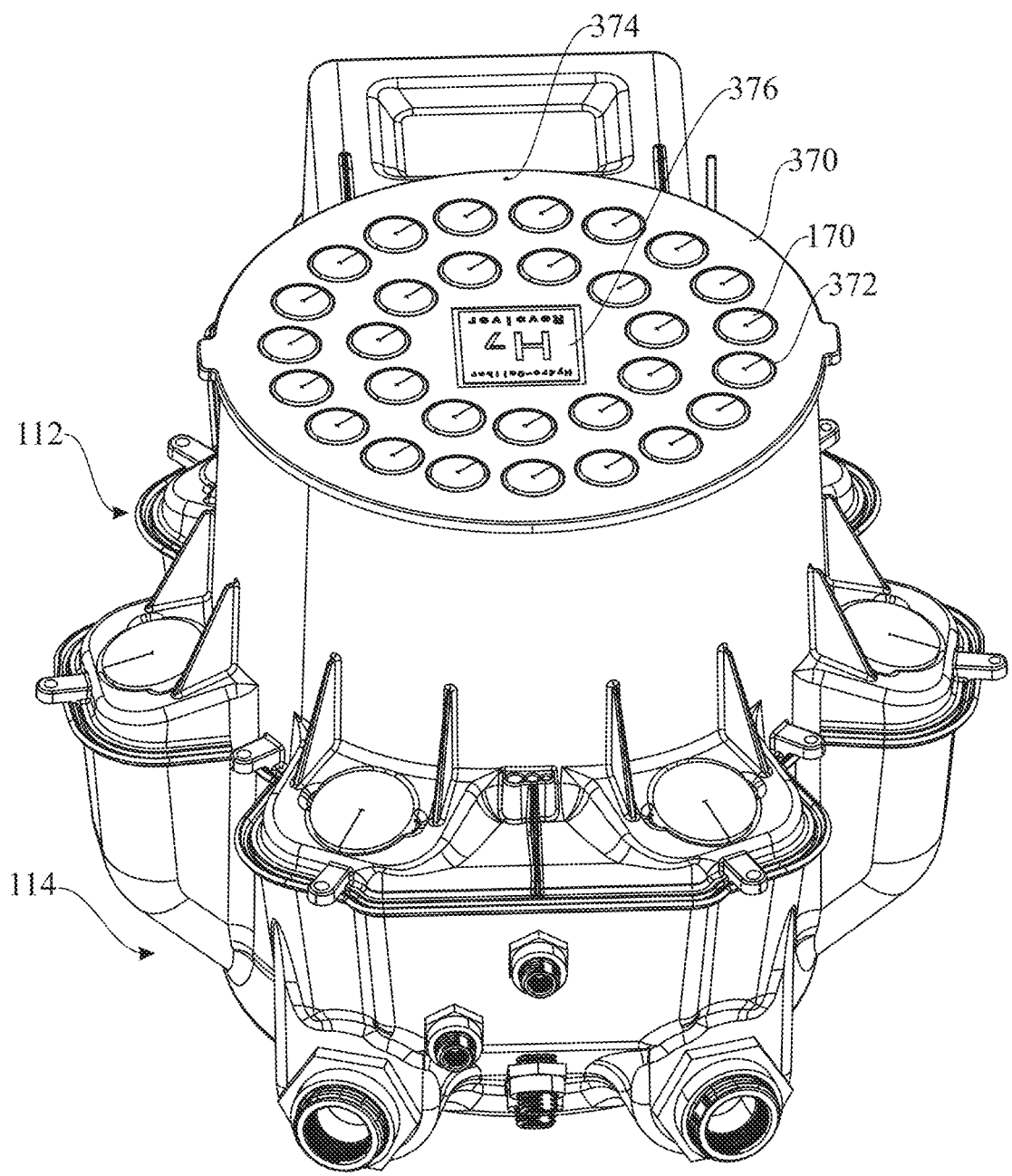
Figure 15:
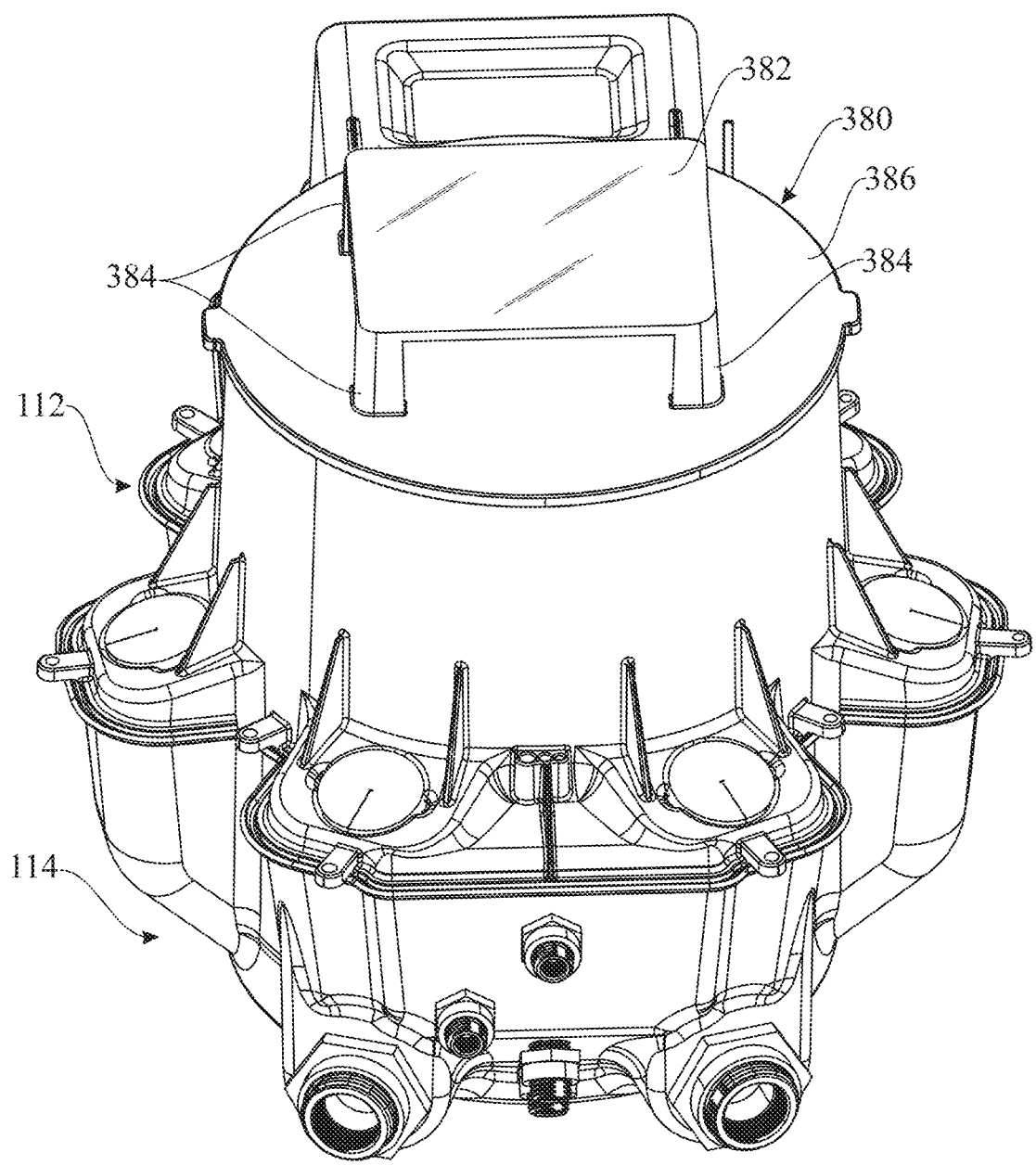
Figure 16:
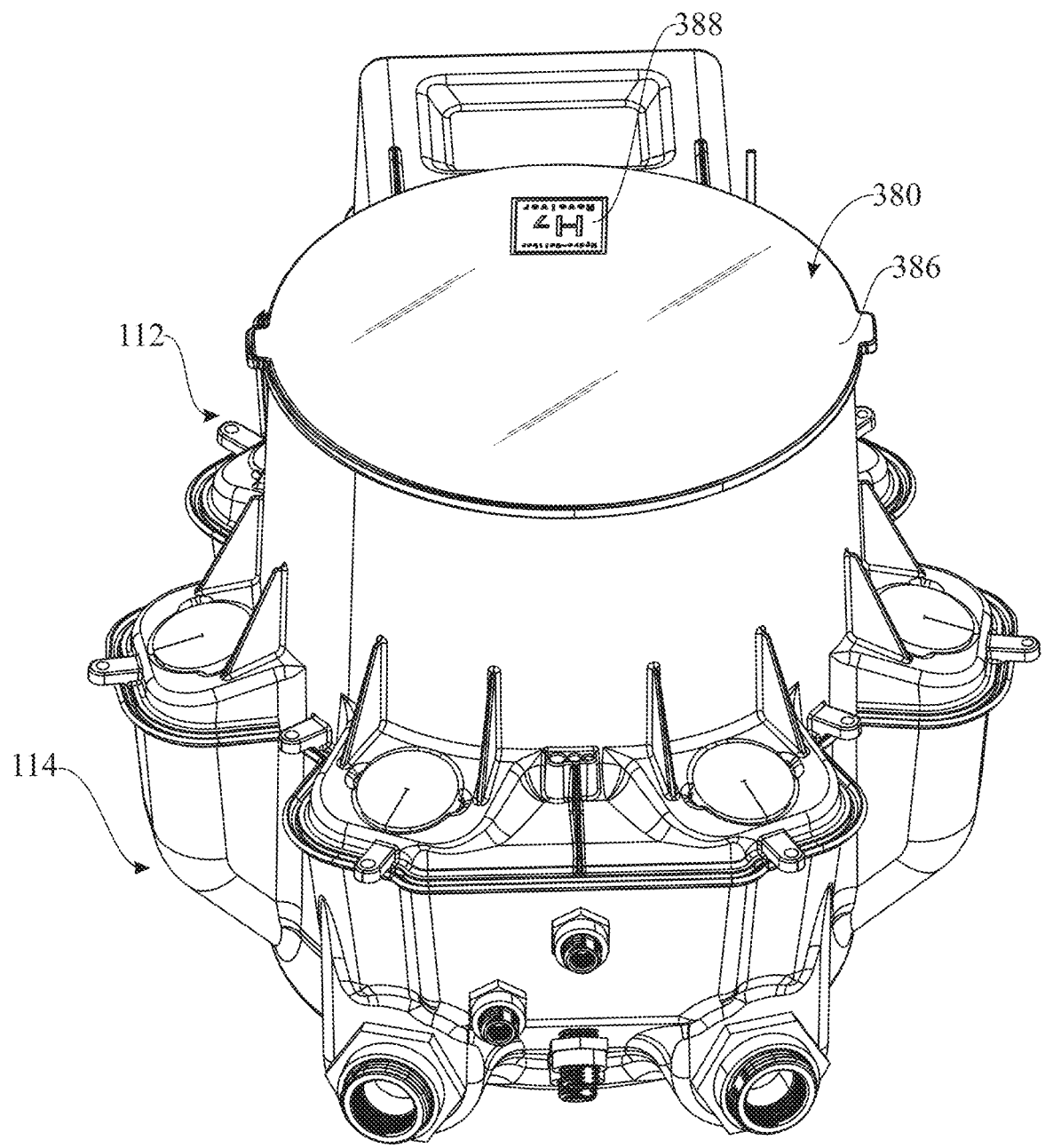
Figure 17:
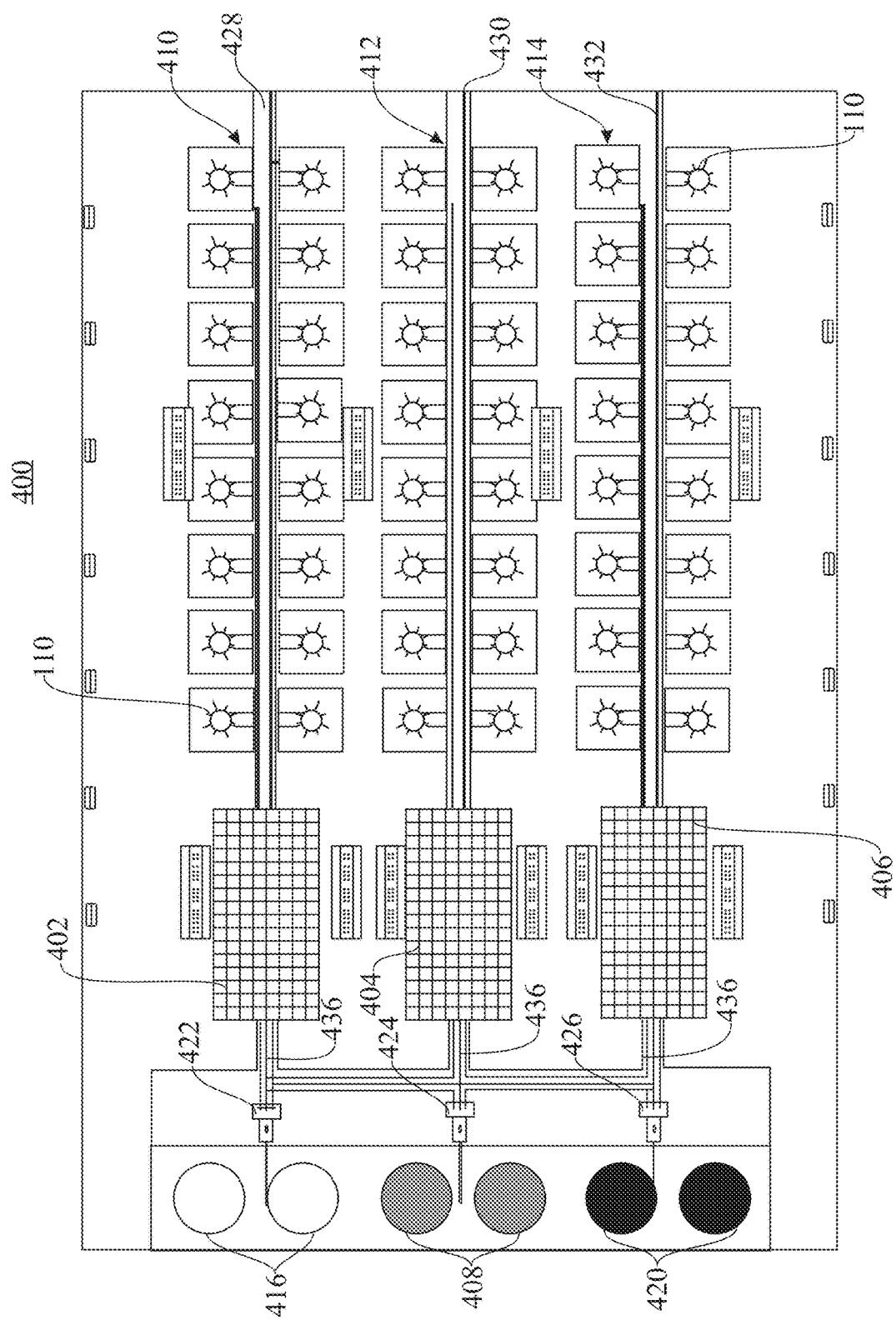
Figure 18:
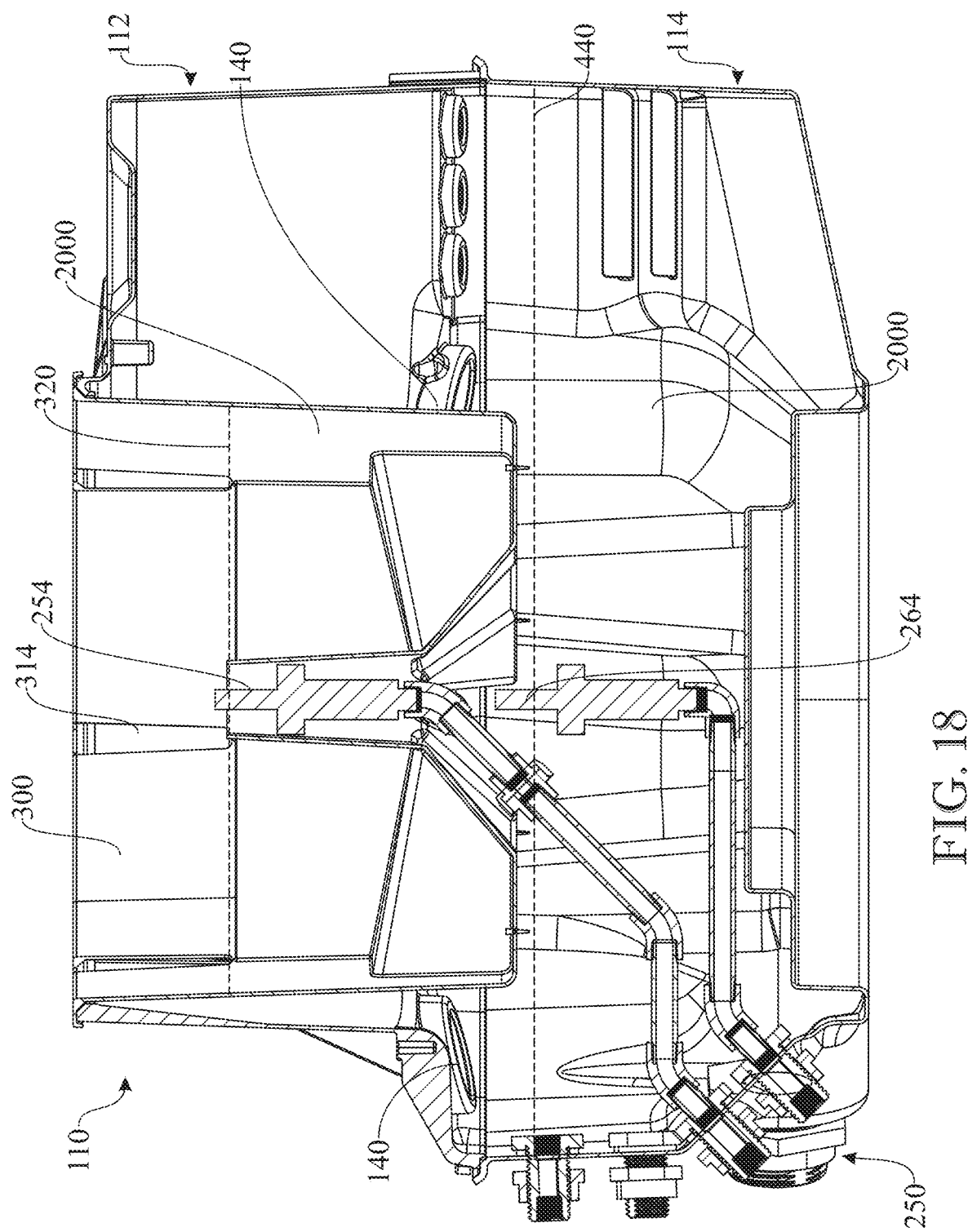
Figure 19:
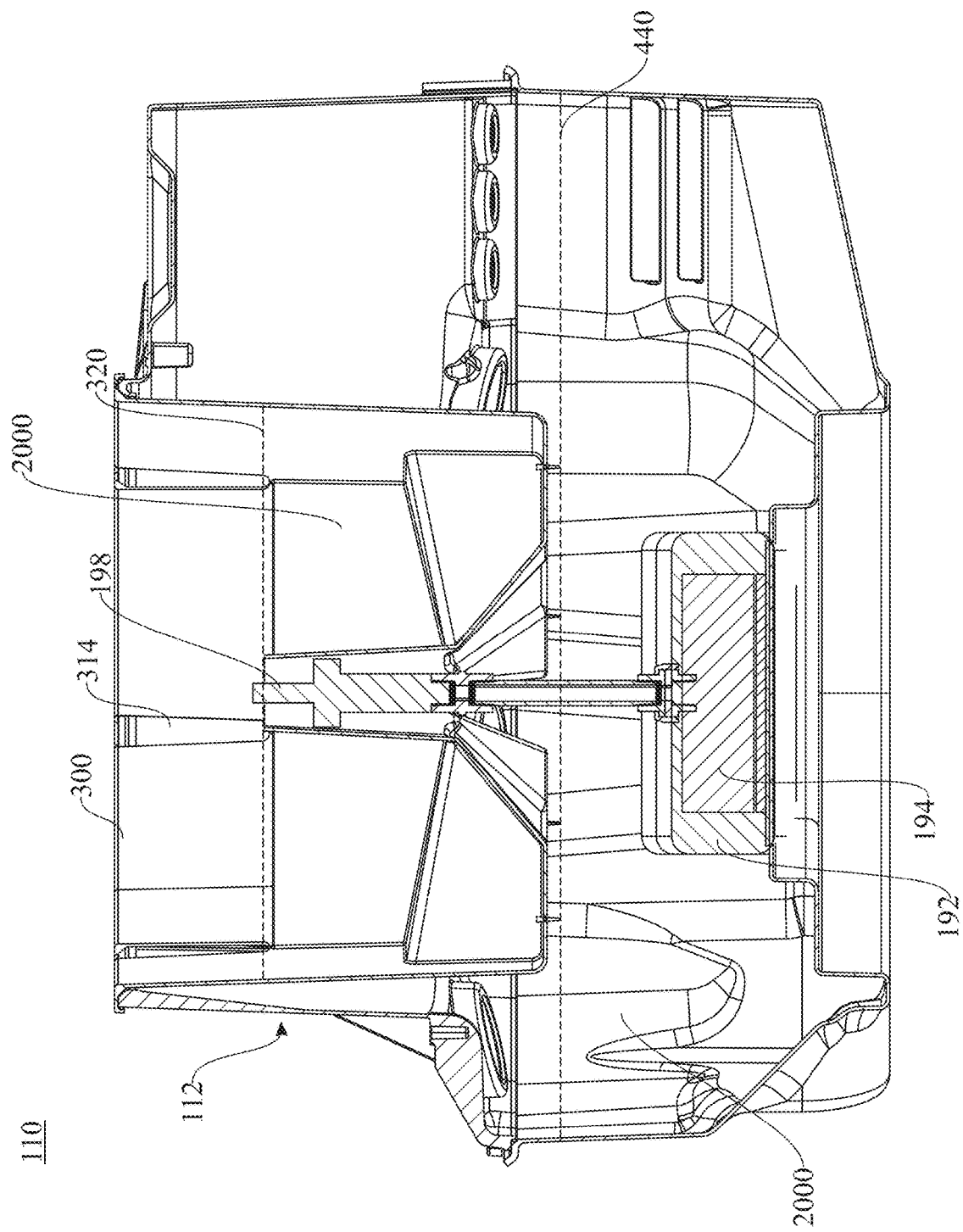
Figure 20:
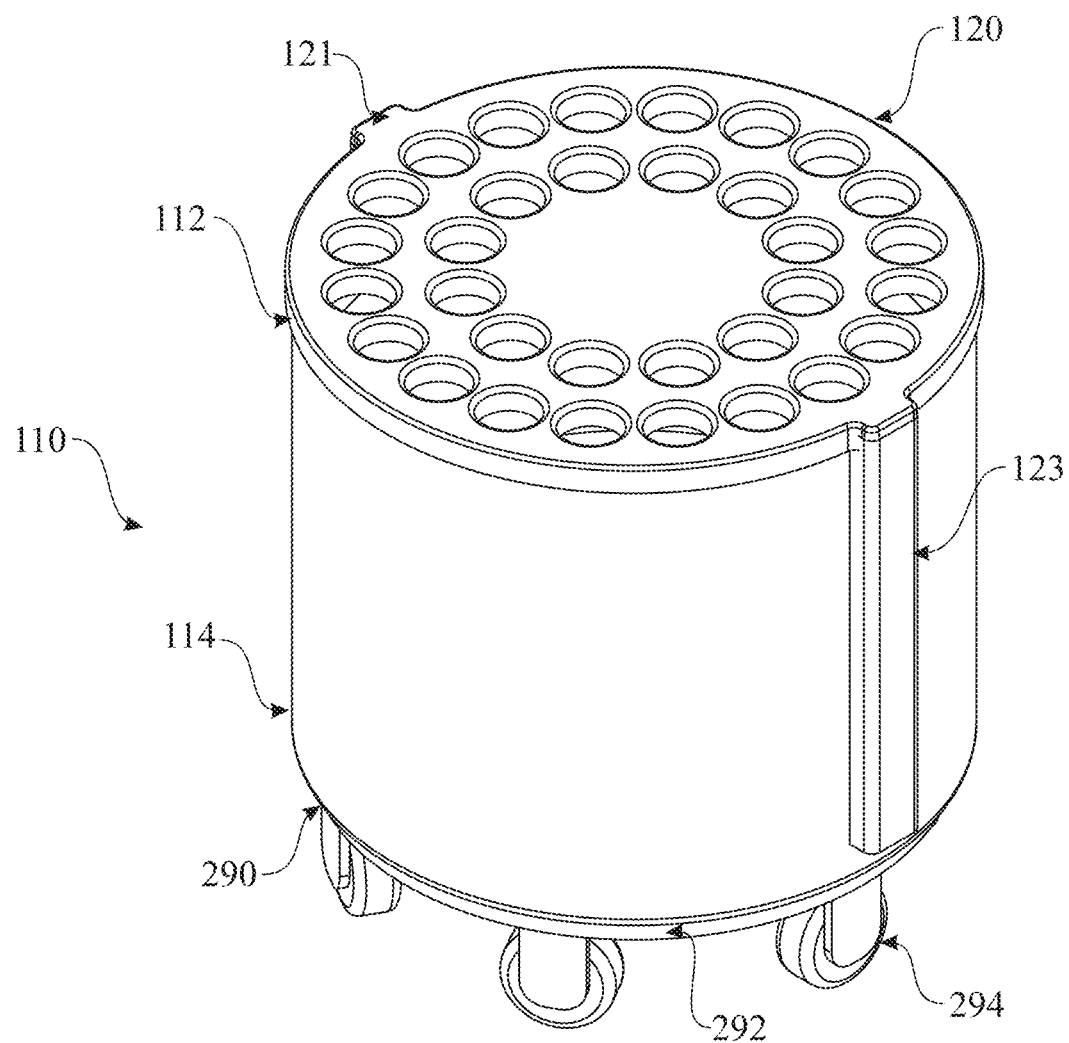
Figure 21:
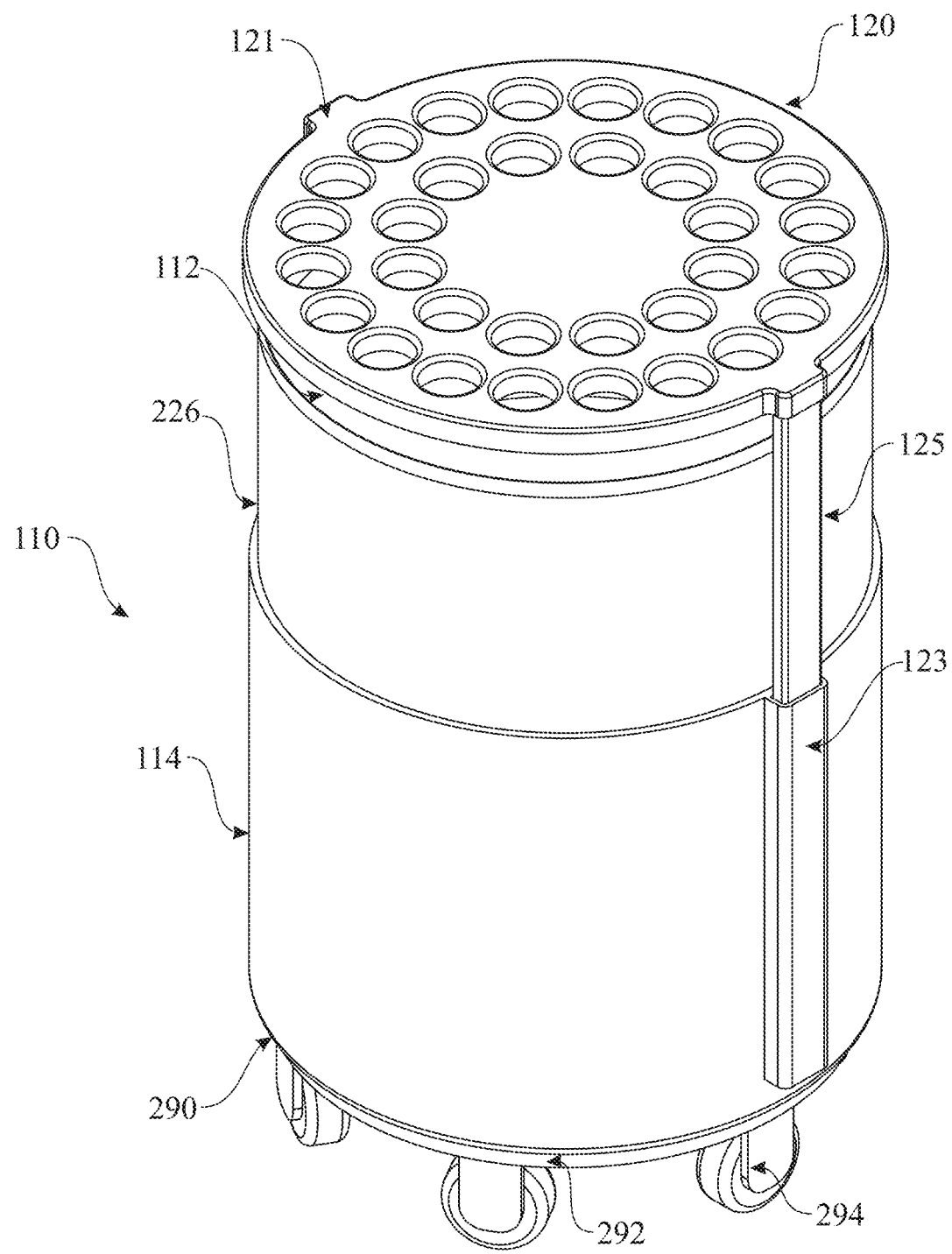
Figure 22:
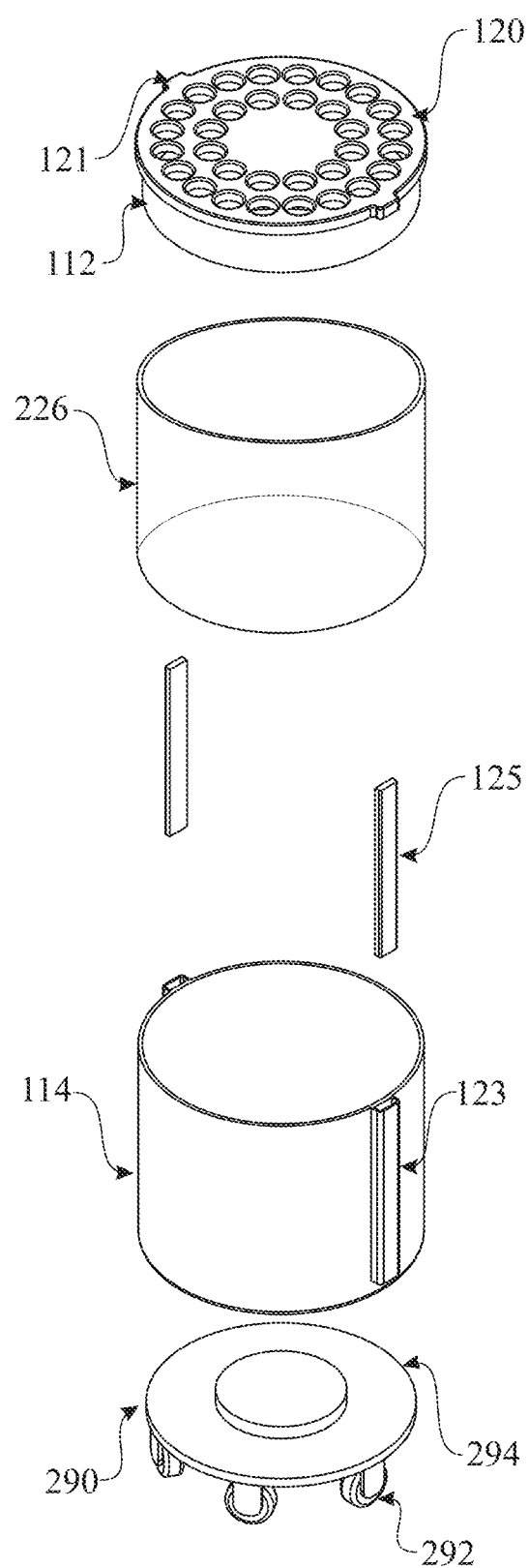
Figure 23:
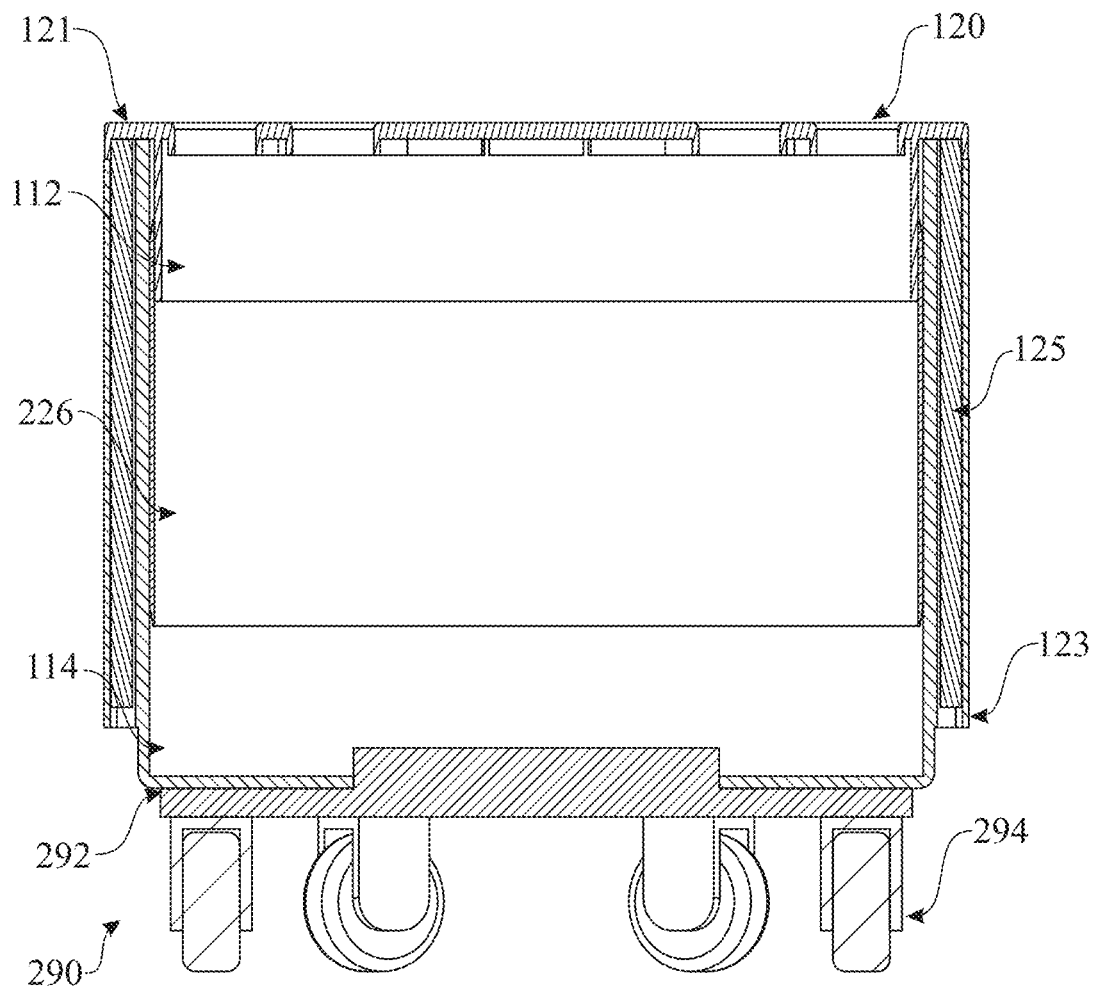
Figure 24:
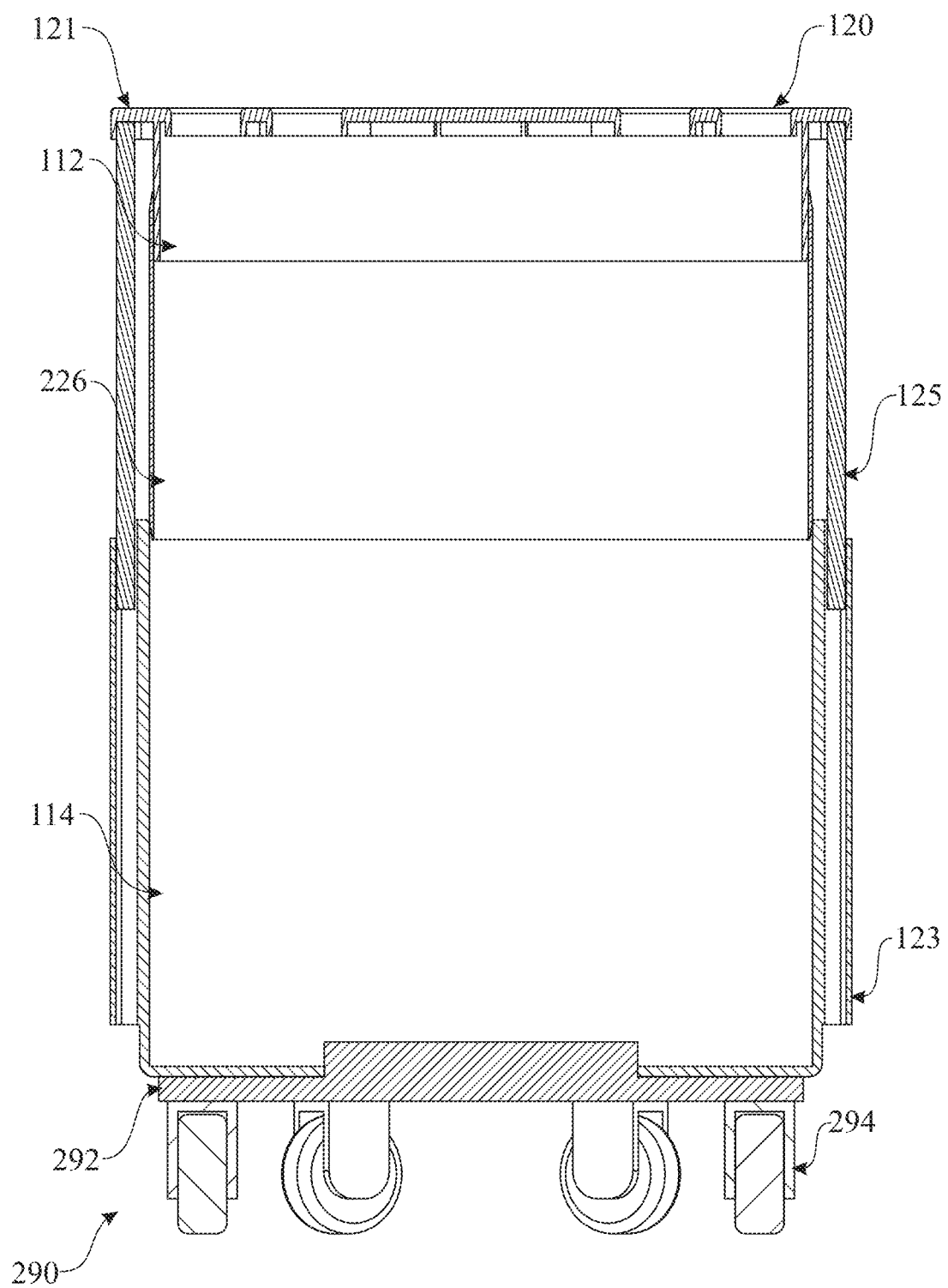
Figure 25:
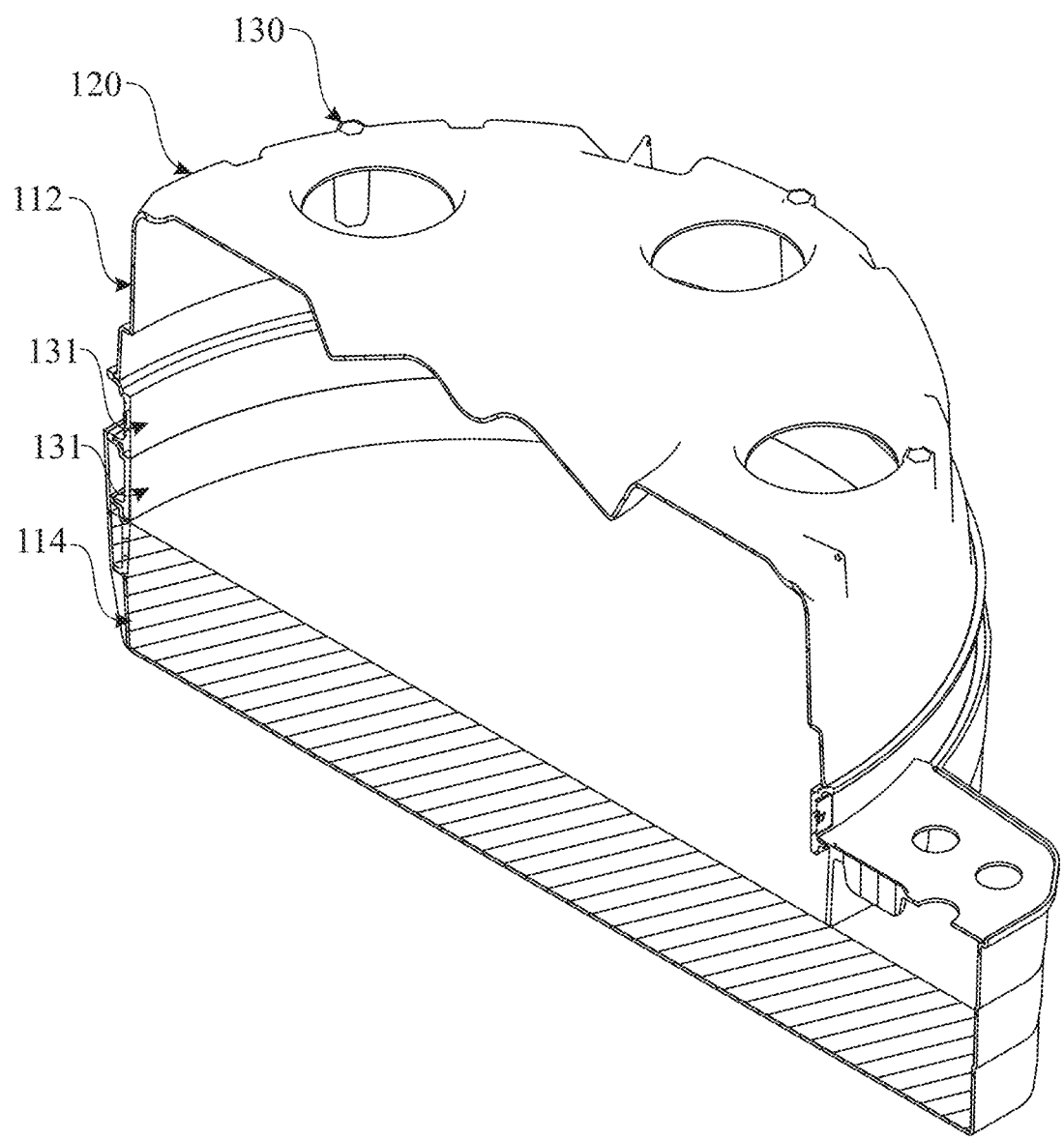
Figure 26:
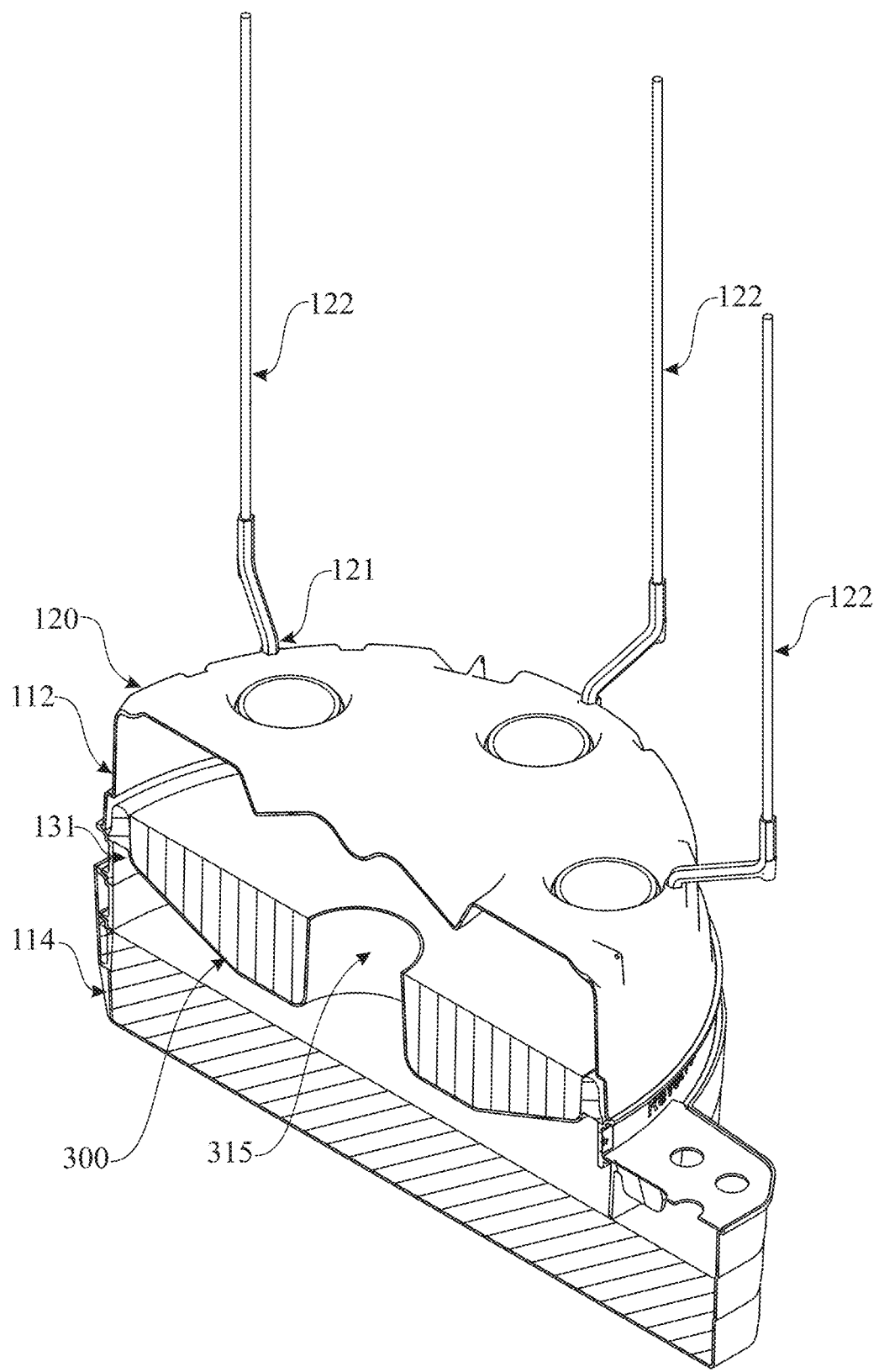

The preferred embodiments of the invention will hereinafter be described in conjunction with the appended drawings provided to illustrate and not to limit the invention, where like designations denote like elements, and in which:

FIG. 1 presents an isometric view of a revolver commercial indoor and outdoor grow system, with a revolver cover shown in phantom, in accordance with a first illustrative embodiment of the present invention;

FIG. 2 presents an enlarged, isometric view of short extension arms in use with the revolver commercial indoor and outdoor grow system of FIG. 1;

FIG. 3 presents an enlarged, isometric view of long extension arms in use with the revolver commercial indoor and outdoor grow system of FIG. 1;

FIG. 4 presents a top isometric view of a revolver seedling insert of the revolver commercial indoor and outdoor grow system of FIG. 1;

FIG. 5 presents a bottom isometric view of the revolver seedling insert of FIG. 4;

FIG. 6 presents an isometric view, with parts separated, of the revolver commercial indoor and outdoor grow system of FIG. 1 incorporating a residential use plumbing system;

FIG. 7 presents an isometric view, with parts separated, of the revolver commercial indoor and outdoor grow system of FIG. 1 incorporating a commercial use plumbing system;

FIG. 8 presents an isometric view, with parts separated, of an upper and lower shell and eight gallon insert bucket of the revolver commercial indoor and outdoor grow system of FIG. 1 along with an external dolly;

FIG. 9 presents a side plan view of the revolver commercial indoor and outdoor grow system of FIG. 1 with the eight gallon insert bucket illustrated in phantom;

FIG. 10 presents a schematic view of a scrog net and revolver stakes for use with the revolver commercial indoor and outdoor grow system of FIG.;

FIG. 11 presents an isometric view of the revolver commercial indoor and outdoor grow system of FIG. 1 incorporating a six site aeroponic lid module;

FIG. 12A presents an isometric view of the revolver commercial indoor and outdoor grow system of FIG. 1 incorporating a six site deep water culture lid module;

FIG. 12B presents a bottom isometric view of the six site deep water culture lid module;

FIG. 12C presents an isometric view, shown in section, of the six site deep water culture lid module installed in the eight gallon bucket;

FIG. 13 presents an isometric view of the revolver commercial indoor and outdoor grow system of FIG. 1 incorporating a twelve site aeroponic lid module;

FIG. 14 presents an isometric view of the revolver commercial indoor and outdoor grow system of FIG. 1 incorporating a thirty site aeroponic lid module;

FIG. 15 presents an isometric view of the revolver commercial indoor and outdoor grow system of FIG. 1 incorporating a solar charged lid module;

FIG. 16 presents an isometric view of the revolver commercial indoor and outdoor grow system of FIG. 1 illustrating a lid for the solar charged lid module of FIG. 15;

FIG. 17 presents a schematic view of a commercial growing system incorporating the revolver commercial indoor and outdoor grow system of FIG. 1;

FIG. 18 presents a side view, shown in section, of the revolver commercial indoor and outdoor grow system of FIG. 1 incorporating the commercial plumbing;

FIG. 19 presents a side view, shown in section, of the revolver commercial indoor and outdoor grow system of FIG. 1 incorporating the residential plumbing;

FIG. 20 presents a schematic view of revolver commercial indoor and outdoor grow system of FIG. 1 when the revolver is placed at a lowest operating height;

FIG. 21 presents a schematic view of revolver commercial indoor and outdoor grow system of FIG. 1 when the revolver is placed at a highest operating height;

FIG. 22 presents an isometric view, with parts separated, revolver commercial indoor and outdoor grow system of FIG. 21;

FIG. 23 presents a cross sectional view of revolver commercial indoor and outdoor grow system of FIG. 20;

FIG. 24 presents a cross sectional view of revolver commercial indoor and outdoor grow system of FIG. 21;

FIG. 25 presents a schematic view of revolver commercial indoor and outdoor grow system of FIG. 1 having a set of sealing members to vary height of the revolver; and FIG. 26 presents a schematic view of revolver commercial indoor and outdoor grow system of FIG. 1 having rotatable lid module.

Like reference numerals refer to like parts throughout the several views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In the following description, certain specific details are set forth in order to provide a thorough understanding of various disclosed implementations. However, one skilled in the relevant art will recognize that implementations may be practiced without one or more of these specific details, or with other methods, components, materials, and the like.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Shown throughout the figures, the present invention is directed toward a revolver type grow system for indoor or outdoor residential or commercial use to propagate plants in an aeroponic, a deep-water culture "DWC" fashion, a recirculating deep-water culture "RDWC" fashion and/or a vertically recirculating deep-water culture "VRDWC" fashion.

Referring initially to FIG. 1, an agricultural plant propagation or grow system, hereinafter agricultural grow system 100, is illustrated in accordance with an exemplary embodiment of the present invention. The disclosed agricultural grow system 100 generally includes a revolver 110 having an upper shell 112 and a lower base shell 114 removably resting on the upper shell 112. A carbon dioxide "CO2" containment cover 116 is provided about the revolver 110 to retain carbon dioxide gasses for enhanced plant growth. The containment cover 116 is held over the revolver 110 by a support system 118. The revolver 110 additionally includes a revolver cap or lid module 120 removably positioned on the upper shell 112 of the revolver. The lid module 120 may take various forms to accommodate varying numbers of plant sites, plant types and hydroponic grow methods/functions as discussed in more detail herein.

Referring for the moment to FIGS. 1-3, the support system 118 is adjustable for supporting the containment cover 116 or a scrog net 332 (FIG. 10) over the revolver 110 to accommodate a variety of growing conditions. The support system 118 generally includes a plurality of vertical support stakes 122 affixed to the revolver 110 by foldable pivoting arms 124.

With specific reference to FIGS. 2 and 3, the foldable pivoting arms 124 may include long arms 126 and short arms 128. Providing long and short arms, 126 and 128, respectively, allow the user to position the support stakes 122, and thus the containment cover 116 or scrog net 332 closer to or further away from the revolver 110 depending on growing conditions.

Each of the long and short arms 126 and 128, respectively, are provided with multiple stake hole series 130 to accommodate different diameters of commercially available support stakes 122. Each of the stake hole series 130 includes a large diameter hole 132, a medium diameter hole 134 and a small diameter hole 136. Mounting hardware 138 is provided to removably attach the foldable pivoting arms 124 (which can be best seen in FIG. 1) of the support system 118 to the revolver 110. The mounting hardware 138 attach to mounting flanges 139 extending from the upper shell 112 (FIG. 3) In the disclosed embodiment, the long arms 126 include four stake hole series 130 while the short arms 128 include only two stake hole series 130. As best shown in FIG. 2, in order to position a support stake 122 very close to the revolver 110, the support stake 122 may be inserted directly through the revolver 110 without use of the mounting hardware 138 and the foldable pivoting arms 124.

Referring specifically to FIG. 1, the revolver 110 includes a plurality of circular lower plant sites 140 on the upper shell 112 of the revolver 110 for the propagation of seedlings. The upper shell 112 of the revolver 110 includes a cylindrical body portion 142 and a generally rectangular nose portion 144 extending outwards from the cylindrical body portion 142. The lower plant sites 140 are positioned at, and extend outward from, a lower edge 146 of the cylindrical body portion 142. The lid module 120 is removably attached to an upper edge 148 of the cylindrical body portion 142 of the upper shell 112. The generally rectangular nose portion 144 of the upper shell 112 includes an access panel 150 provided on an end plate 152 of the nose portion 144. The access panel 150 is removable to access the interior of the revolver 110 for maintenance and configuration of plumbing systems as discussed in more detail hereinbelow. In the disclosed embodiment, the upper shell 112 includes six lower plant sites 140 (see also FIG. 8).

The lower base shell 114 generally includes a bowl 154 and a generally rectangular nose 156 extending from the bowl 154. The bowl 154 is provided with a series of lower plant site troughs 158, positioned directly beneath the lower plant sites 140 of the upper shell 112, to allow plants being propagated within the lower plant sites 140 to be exposed to water contained in the bowl 154.

The lid module 120 is provided with a plurality of upper plant sites 160. The nose portion 144 of the upper shell 112 is additionally provided with additional stake hole series 162, similar to the stake hole series 130 discussed above, located through a top panel 164 of the nose portion 144. The additional stake hole series 162 are provided to accommodate additional support stakes 122. In order to properly align the lid module 120 on the upper shell 112 of the revolver 110, the top panel 164 includes a first alignment mark 166 and the lid module 120 includes a second alignment mark 168. The first and second alignment marks 166 and 168, respectively, ensure that plants growing in the upper plant sites 160 of the lid module 120 are in proper alignment with the spraying and plumbing systems within the revolver 110 as discussed hereinbelow.

Turning now to FIGS. 4 and 5, the disclosed agricultural grow system 100 is provided to propagate plant seedlings without the use of conventional dirt type grow mediums. This allows roots of the seedling to be directly exposed to water to enhance the growth rate. The disclosed agricultural grow system 100 thus includes a plurality of seedling inserts 170 which are removably insertable into the lower and upper plant sites 140 and 160, respectively (which can be best seen in FIG. 1). The seedling insert 170 generally includes a cylindrical body portion 172 defining a V-shaped notch 174 cut out of the cylindrical body portion 172. The V-shaped notch 174 facilitates placement of a seed or seedling into the seedling insert 170.

The cylindrical body portion 172 has a top portion 176, a side portion 178 and a bottom portion 180. The V-shaped notch 174 extends completely through the top, side and bottom portions 176, 178 and 180 of the cylindrical body portion 172. The cylindrical body portion 172 further defines a seedling hole 182 at an apex of the V-shaped notch 174 for receipt of the seed and/or seedling. Preferably, the seedling insert 170 has a diameter "d" of approximately two to four inches and a thickness "t" of approximately one to two inches. The seedling insert 170 may be formed from a variety of materials including foam, cork, etc.

With specific reference to FIG. 5, in order to allow water to be sprayed onto a root of a seedling such as, for example, a seedling 1000 having a seed kernel 1010 and a tap root 1020, the cylindrical body portion 172 defines a cored out area or partial bore 184 extending upward or downward from the bottom portion 180 to the seedling hole 182. This allows the tap root 1020 to be directly sprayed with water as well as allowing for room for the tap root 1020 to grow and expand. If downward, it allows tap root to be closer to spray if there is a shelf or need to get lower. In a particular embodiment, the partial bore 184 is a conical shaped bore. The partial bore 184 may, alternatively, have differing shapes such as, for example, cylindrical, oval, rectangular or square and may be symmetrical or asymmetrical. The bore can be on top or bottom or a variance or both to allow for best access to spray.

Referring to FIG. 6, there is disclosed the revolver 110 of agricultural grow system 100 incorporating a residential plumbing system 190. The residential plumbing system 190 is positioned in the bowl 154 of the lower base shell 114 and extends upward into the cylindrical body portion 142 of the upper shell 112. The residential plumbing system 190 generally includes a filter 192 and a pump housing (hereafter referred to as 'pump') 194 located beneath the filter 192. The pump 194 acts as a frame about which the filter 192 is wrapped around or supported. The filter 192 and the pump 194 are positioned in the bowl 154 of the lower base shell 114 which acts as a sump from which the pump housing 194 draws water. A spray shaft 196 extends upward from the pump 194 and terminated in a single spray head 198. The spray shaft 196 is sufficiently long enough to position the spray head 198 in the cylindrical body portion 142 of the upper shell 112. The spray shaft 196 and spray head 198 are adjustable in height within the upper shell 112 and lower base shell 114 to accommodate roots as they grow and descend within the upper shell 112 and lower base shell 114 and the system is reconfigured over time.

The residential plumbing system 190 is a recirculating system draws water out of an interior chamber 200 of the bowl 154 the lower base shell 114 and sprays the water into an interior chamber 202 of the cylindrical body portion 142 of the upper shell 112. The water then drains down into the lower base shell 114 where it is picked up by the pump 194 for direction to the spray head 198. Power and control means (not shown) for the pump 194 are provided to control the force and duration of water spray emanating from the spray head 198. The upper shell 112 defines a top opening 204 in the cylindrical body portion 142 of the upper shell 112.

As noted hereinabove, the upper shell 112 includes a generally rectangular nose 144 having an end plate 152 and a top panel 164. The generally rectangular nose 144 of the upper shell 112 additionally includes side panels 206 and 208. Together, the top panel 164 and the side panels 206 and 208 define an access channel 210. The access channel 210 is provided to allow the user or operator to service and/or replace the residential plumbing system 190 or any component thereof. As discussed above, the upper shell 112 includes an access panel 150 movably mounted to the upper shell 112. The access panel 150 is slidably mounted to the end panel 152 of the generally rectangular nose 144 of the upper shell to seal the interior chambers 200 and 202 of the bowl 154 and the cylindrical body portion 142, respectively, while allowing access to the interior chambers 200 and 202, respectively.

The upper shell 112 rests upon the lower base shell 114. The rectangular nose 156 of the lower base shell 114 includes an end plate 212 and side panels 214 and 216. The cylindrical body portion 142 of the upper shell 112 has the lower edge 146 which sealingly engages an upper edge 218 of the bowl 154 of the lower base shell 114. Likewise, the rectangular nose 144 of the upper shell 112 has a lower edge 220 which sealingly engages and upper edge 222 of the rectangular nose 156 of the lower base shell 114.

In order to keep the water draining into the bowl 154 of the lower base shell 114, and to prevent the water from spraying through the access panel 150, the upper shell 112 is provided with a sealing curtain 226 behind the access panel 150. The sealing curtain 226 extends 3609 completely around interiors of the upper shell 112 and the lower base shell 114 to drain water sprayed in the upper shell 112 down into the lower base shell 114 and to provide a seal between the upper shell 112 and the lower base shell 114.

Finally, in order to inform the user or operator of the water level in the lower base shell 114, the revolver 110 is provided with a water level float 230. The float 230 is freely positioned in a mount 232 in the upper shell 112 and a mount 234 in the lower base shell 114. In this embodiment, the float 230 is located in the rectangular noses 144 and 156 of the upper shell 112 and the lower base shell 114, respectively.

The residential pluming system 190 may also be supplied with external systems. For example, the residential plumbing system 190 may be provided with and external water tank and connection lines and inlet and outlet ports (not shown) associated with the lower base shell 114.

With reference to FIG. 7, there is disclosed the revolver 110 of the agricultural grow system 100 incorporating a commercial plumbing system 250. In this embodiment, the filter 192 and pump 194 of the residential plumbing system 190 of FIG. 6 are removed. In the commercial plumbing system 250, the pumping and filtering, as well as power and control, systems are external to the revolver 110 (not shown). The commercial plumbing system 250 includes a first spray shaft or line 252 and a first spray head 254. The first spray head 254 is located at a first end 256 of the first spray line 252. A second end 258 of the first spray line 252 is connected to a first supply connection port 260 through the lower base shell 114 (See also FIG. 9). Water is supplied to the first supply connection port 260, and thus to the first spray head 254, from an external pumping and filtering systems (not shown) associated with a commercial sized growing system incorporating multiple agricultural grow systems 100 (See FIG. 17).

The commercial plumbing system 250 may contain multiple spray heads. In this embodiment, the commercial plumbing system 250 additionally includes a second spray shaft or line 262 and a second spray head 264 located at a first end 266 of the second spray line 262. A second end 268 of the second spray line 262 is similarly connected to a second supply connection port 270. The first and second spray lines 252 and 262, and thus the first and second spray heads 254 and 264, may be run at the same time or independent of each other.

The first and second spray heads 252 and 262 of the commercial plumbing system 250 are positioned within the interior chamber 202 of the cylindrical body portion 142 of the upper shell 112. Alternatively, and as discussed hereinbelow, the second spray head 262 is positioned in the lower base shell 114. The first and second spray heads 252 and 262, respectively, are positioned on a common center axis x-x of the upper shell 112 and lower base shell 114. The commercial plumbing system 250 may include one or more additional supply connection ports, such as, for example, a third supply connection port 272.

In contrast to the internally recirculating water system of the residential plumbing system 190, the commercial plumbing system 250 circulates water from outside the revolver 110, into the revolver 110 and back out again. Thus, the commercial plumbing system 250 includes one or more water drain ports, such as, for example, a first drain port 274, a second drain port 276 and a third drain port 278. This allows water for flow in and out of the system as well as up and down within the system to accomplish a vertical recirculating deep water culture "VRDWC" type operation.

Turning now to FIG. 8, the upper shell 112 is provided with auxiliary ports 280 for use in connecting additional equipment such as, for example, temperature or PH monitoring probes and equipment, additional water supply and/or return lines, additional grow sites, etc. In the disclosed embodiment there is a first auxiliary port 282, a second auxiliary port 284, and a third auxiliary port 286 located on the rectangular nose 144 of the upper shell 112 and in fluid communication with the rectangular nose 156 of the lower base shell 114.

The agricultural grow system 100 may additionally include a dolly 290 having a base 292 and a plurality of wheel 294. The revolver 110 sits on the dolly 290 and can be easily moved around a growing area. The dolly 290 is a typical commercially available trash can type dolly the use of which provides significant financial savings over the use of more expensive agricultural type dollys.

The revolver 110 additionally includes an insert bucket 300 to retain a level of water close to the roots of plants being propagated in the upper plant sites 160 of the lid module 120 (FIG. 1). The insert bucket 300 generally includes a cylindrical side wall 302 having an open top edge 304 and a closed bottom 306 defining an interior chamber 308. A central through-bore channel 310 extends upward within the interior chamber 308. The channel 310 is provided to receive a spray shaft and spray head of the disclosed plumbing systems. Partitions 312 are provided in the insert bucket 300 to allow individual roots to propagate separately. Drain slots 314 are formed though the cylindrical side wall 302 to allow water to drain out of the interior chamber 308 and define a maximum fill water level within the interior chamber 308 of the insert bucket 300.

In this particular embodiment, the insert bucket 300 includes six partitions 312 to define six grow areas corresponding to the six upper plant sites 160 in the lid module 120 (FIG. 1). Additional drain holes 316 may be provided in the bottom 306 of the insert bucket 300 to allow water to slowly drain out. In the disclosed embodiment, the insert bucket 300 has an eight gallon capacity.

As best shown in FIG. 9, the insert bucket 300 is positioned within the interior chamber 202 of the cylindrical body portion 142 of the upper shell 112. When water 2000 is moved into the revolver 110 through one of the supply connection ports 260, 270 or 272, water 2000 is sprayed into the insert bucket 300 by the first spray head 254 (FIG. 7). The water 2000 fills the insert bucket 300 until the water 2000 reaches the drain slots 314. The water 2000 then drains down into the lower base shell 114 where it drains back out of the system through one of the first, second or third drain ports 274, 276 or 278, respectively. Thus, bottoms 318 of the drain slots 314 help to define a maximum water fill level or line 320 within the insert bucket 300. This allows tap roots 1020 (FIG. 5) to be grown aeroponically when they are above the water level line 320 and in a deep-water culture ("DWC") environment when they have grown sufficiently long enough to extend down below the water level line 320.

The water 2000 draining down through the drain slots 314 is aerated and thus provides aerated water 2000 to the plants being propagated in the lower plant sites 140. In this manner, the revolver 110 with the insert bucket 300 acts as a dual-sump system for propagating plants at different levels. Additionally, in the preferred embodiment, the lower base shell 114 may retain an additional volume of 25 gallons of water.

Turning for the moment to FIG. 10, a scrag net 332 of the agricultural grow system 100 is suspended above the revolver 110 through the use of the support stakes 122 (FIG. 1). The support stakes 122 are provided with slits 330 onto which the scrag net 332 is hooked. The scrag net 332 is provided to capture and support plants as the grow up out of the revolver 110. Preferably, the slits 330 are cut into the stakes at an angle $\alpha$ of approximately 45°.

Referring to FIGS. 11 and 12, there is disclosed a second embodiment of a revolver cap or lid module 340 for use in the revolver 110 of the agricultural grow system 100. The lid module 340 is provided for propagating seedlings 1000 in aeroponic and deep-water culture environments and includes six plant sites 342 for receipt of six seedling inserts 170. A LOGO 344 may be provided in the lid module 340 identification of various factors, such as, for example, company identification, agricultural grow system 100 identification as well as revolver 110 type, plant types being propagated, etc.

The lid module 340 additionally includes an alignment mark 346 for use in aligning the lid module 340 on the upper shell 112. Further, the lid module 340 may be provided with one or more stake hole series 348, similar to the stake hole series 130 described hereinabove with regard to the upper shell 112 (FIG. 1). This allows the support stakes 122 to be inserted directly through the lid module 340 when supporting the carbon monoxide "CO2" containment net 116.

Referring to FIG. 11, the six site lid module 340 can be formed as a six site lid module 340a having shallow plant sites 342 to allow the plants to be propagated in an aeroponic fashion. Alternatively, the six site lid module 340 can be formed as a six site lid module 340b having deeper plant sites 342 (FIGS. 12A-12C) to allow for initial deep water culture propagation and subsequent aeroponic continued propagation as discussed below.

With specific reference to FIG. 12A, the plant sites 342 are formed as deep depressions 350 in the second lid module 340b. The second lid module 340b is positioned in the upper shell 112 to allow the roots to initially reach water contained in the eight gallon bucket 300. The plants are thus initially grown in a deep water culture environment. As the commercial plumbing system 250, or residential plumbing system 190, sprays aerated water 2000 onto the roots of the seedlings 1000, the roots grow down into the bucket 300 resulting a DWC type growing system. This allows seedlings 1000 positioned in the seedling inserts 170 to be propagated in a deep-water culture.

As best shown in FIG. 12B, the second lid module 340b includes an outer rim 352 and a collar 354 extending downward from the outer rim 352. This allows the plant sites 342 to be placed lower in the eight gallon bucket 300 to propagate seedlings in the deep water culture method. The second lid module 340b additionally includes a central, downwardly extending sleeve 356 having a deflector plate 358. The deflector plate 358 is provided to deflect and aerate water sprayed onto the deflector plate 358 and direct the aerated water toward roots of the plants being propagated to allow for aeroponic propagation.

Turning for the moment to FIG. 12C, the second lid module 340 is disclosed positioned in the eight gallon bucket 300. The outer rim 352 of the second lid module 340b rests on the open top 304 of the eight gallon bucket 300 while the collar 354 extend downward along the inside of the cylindrical side wall 302 of the eight gallon bucket 300. This allow the plant sites 342 of the second lid module 340 to sit deeper in the eight gallon bucket 300 to allow for deep water culture propagation.

Once the roots of the plant have grown to a desired length, the six site second lid module 340b can be gently removed, with the plants and roots intact, and the eight gallon bucket 300 removed. The second lid module 340b is then replaced in the upper shell 112 with the roots of the plants extending downward towards the lower base shell 114. As shown, spray nozzle 198 of the spray shaft 196 of the residential plumbing 190 extends up through the through bore channel 310 in the eight gallon bucket 300 and is positioned adjacent to the deflector 358 of the second lid module 340. In operation, the spray nozzle 198 sprays water against the deflector 358 which causes the water to become aerated and directed towards the plant sites 342. This causes aerated water to reach the roots of the plants and propagate them in aeroponic fashion. The spray nozzle 198 and/or the spray shaft 196 may be dropped or positioned lower in the upper shell 112 and/or the lower base shell 114 to accommodate the downward growth of the plant roots. As noted hereinabove, the sealing curtain 226 (FIG. 6) extends completely around the inner diameters of the upper shell 112 and the lower base shell 114 to completely seal the interior of the revolver 110.

It should be noted that this allows for an extended aeroponic mode of growth until the roots of the plants being propagated extend down into water contained in the lower base shell 114. Thereafter, the plants may again be propagated in a deep water culture environment with upper reaches of the roots still being sprayed with water for aeroponic growth.

Referring now to FIG. 13, there is disclosed a further alternative third embodiment of a lid module 360 having twelve plant sites 362 for receipt of twelve seedling inserts 170. The lid module 360 includes an index mark 364 to align the lid module 360 with the upper shell 112 of the revolver 110. A central indicia area 366 is provided to retain information on the types of seedlings 1000 being propagated. As shown, similar indicia 368 may be provided on the access panel 150.

Referring to FIG. 14, there is disclosed yet another embodiment of a lid module 370 for use with the revolver 110. The fourth lid module 370 is a thirty site module having thirty plant sites 372 for receipt of thirty seedling inserts 170. While not specifically shown, the fourth lid module 370 allow for aeroponic watering and growth of seedlings 1000 propagated in the seedling inserts 170. The fourth lid module 370 includes an index mark 374 to align with the upper shell 112 and an indicia area 376 to provided data on the seedlings 1000 being propagated.

Turning now to FIGS. 15 and 16, there is disclosed a fifth or plain lid module 380, having no plant sites, for use with the revolver 110. The fifth lid module 380 is provided for use with an ebb and flow table (not shown) into which the fifth lid module 380 will be integrated.

The fifth lid module 380 also provides support to a charged lid panel 382 for powering the agricultural grow system 100. The charged lid panel 382 is provided to support a solar panel, a light panel, etc. The charged lid panel 382 is supported on support legs 384 extending upward from an upper surface 386 of the fifth lid module 380. The charged lid panel 382, the support legs 384, and the fifth lid module 380 are preferably integrally formed.

With specific reference to FIG. 16, the fifth lid module 380 covers and seals the interior chamber 202 of the upper shell 112 (FIG. 6). Indicia 388 may be provided on the upper surface 386 of the fifth lid module 380.

Referring now to FIG. 17, there is disclosed a commercial grow system layout 400 incorporating a large number of the disclosed agricultural grow systems 100. As shown, the layout 400 includes growing zones one and two 402, zones three and four 404, and zones five and six 406. Storage tanks 408 are provided to supply water to zones 402, 404, and 406. The layout 400 may additionally include as second area of zones seven and eight 410, zones nine and ten 412, and zones eleven and twelve 414 serviced by water storage tanks 416. Additional water storage tanks 420 are provided to service additional zones (not shown) of agricultural grow systems 100.

The layout 400 further includes pump and valve boxes 422, 424, and 426 to control the flow of water from the respective storage tanks to the associated growing zones. Trenches 430, 432, and 434 are provided to assist in delivery and return of water from the storage tanks to the associated agricultural grow systems 100. This allows the disclosed agricultural grow systems to be used on a large scale commercial basis.

Referring to FIG. 18, the revolver 110 is disclosed incorporating the commercial plumbing system 250 of FIG. 7. As noted above, the commercial plumbing system uses and external source of water. The lower base shell 114 acts as a sump having a water level or water line 440. This allow seedlings 1000 being propagated in the lower plant sites 140 of the upper shell 112 to be grown in a deep-water culture. This additionally provides a source of water to keep the seedings 1000 watered in the event of a loss of water from the external source.

The second spray head 264 of the commercial plumbing system 250 provides aerated water 2000 to the seedlings 1000 being propagated. The first spray head 254 of the commercial plumbing system 250 provides aerated water 2000 to seedlings 1000 being propagated in the upper plant sites (not shown). The water 2000 is sprayed into the bucket 300 and drains out the slots 314 when the water reaches the maximum fill line 320 in the bucket 300. The water 2000 is collected in the bucket 300 and drains down into the lower base shell 114. The water 2000 below the maximum fill line 320 is retained in the bucket 300 which also acts as a sump for a source of water 2000. Thus, the commercial plumbing system 250 is a dual sump system for propagating seedlings 1000.

Referring to FIG. 19, the revolver 110 is disclosed incorporating the residential plumbing system 190 of FIG. 6. In this embodiment, the water 2000 is sprayed into the bucket 300 by the spray head 198 and drains out of the bucket 300 when the water level reaches the maximum fill line 320. The aerated water 2000 then drains down into the lower base shell 114 which acts as the sump and source of water for the residential plumbing system 190. As noted hereinabove, the residential plumbing system 190 includes a pump 194 and filter 192 positioned in the lower base shell 114 which acts as a sump to supply water 2000 to the pump 194. Thus, the revolver 110 utilizing the residential plumbing system 190 is a closed and recirculating system.

Referring to FIG. 20, the revolver 110 is disclosed which is having lowest operating height. The revolver 110 includes the lid module 120 or the upper shell 112, and placed directly below the lower base shell 114. At least one of the upper shell 112 and the lid module 120 is provided with a support mechanism 121 to hold one or more height adjusting members 125 (can be seen in FIG. 21) to vary the position of the upper shell 114 or the lid module 120 with reference to the lower base shell 114. In some embodiments, the one or more height adjusting members 125 may comprise telescopic height adjustable columns. The revolver 110, as shown in FIG. 20, is placed at the lowest operating height. Further, the lower base shell 114 includes one or more receiving members 123 to receive the one or more height adjusting members 125 that are attached to the support mechanism 121 at one end. Further, the revolver 110 is placed on the dolly 290 having the base 292 and a plurality of wheels 294. The revolver 110 sits on the dolly 290 and can be easily moved around a growing area. The dolly 290 may be a typical commercially available trash can type dolly the use of which provides significant financial savings over the use of more expensive agricultural type dollies.

Referring to FIG. 21, the revolver 110 is shown at the highest operating height. The one or more height adjusting members 125 placed within the one or more receiving members 123 to vary the position of the upper shell 112 or the lid module 120 on the lower base shell 114. Further, the revolver 110 includes a seal curtain 226 that attaches to the interior chambers of lower base shell 114 to provide the sealing between the lower base shell 114 and the upper shell 112 when the upper shell 112 or the lid module 120 is moved vertically on the lower base shell 114 using the sealing curtain 226 and the one or more height adjusting members 125. The revolver 110, as shown in FIG. 21, is placed at the highest operating height. In one embodiment, the highest operating height may be at least 10 to 12 inches from the lowest operating height.

Referring to FIG. 22, discloses individual components of the FIGS. 20 and 21. As shown in FIG. 21, the lid module 120 or the upper shell 112 is disclosed having the support mechanism 121. The seal curtain 226 is shown below the upper shell 112 which provides the proper sealing when the lid module 120 or the upper shell 112 are moved. Adjacent to the seal curtain 226, the two height adjusting members 125 are shown which help the upper shell 112 or the lid module 120 to move freely on the lower base shell 114. In one embodiment, the two height adjusting members 125 may be two support stakes 122. Below the two support stakes 122, the lower base shell 114 is shown which has at least one receiving member 123 that provides the support for the support stakes 122 or the height adjusting members 125 and enables the vertical movement of the lid module 120 and the upper shell 112 independent of the lower base shell 114 and other components. Below the lower base shell 114, the dolly 290 is shown which is having the base 292 and a plurality of wheesl 294. The revolver 110 sits on the dolly 290 and can be easily moved around a growing area. =

Referring to FIG. 23, a cross sectional view of the revolver shown in FIG. 20 is disclosed. The cross section view clearly illustrates various components as shown in FIG. 20 and a relative position of the upper shell 112 or the lid module 120 with respect to the lower base shell 114 which is at a lowest operating height.

Referring to FIG. 24, a cross sectional view of the revolver shown in FIG. 21 is disclosed. The cross section view clearly illustrates various components as shown in FIG. 21 and a relative position of the upper shell 112 or the lid module 120 with respect to the lower base shell 114 which is at a highest operating height. The highest operating height is at least 10 to 12 inches from the lowest operating height. The revolver 110 provided with the height adjusting mechanism as shown in FIGS. 20-24 so as to vary the height of the revolver 110 as the seedlings propagate and grow.

Referring to FIG. 25, the revolver 110 is disclosed which may vary its height using a set of sealing members 131. The revolver 110 includes the set of sealing members 131 which are placed between the lower base shell 114 and at least one of the upper shell 112 and the lid module 120. The set of sealing members 131 provide necessary height adjustment and vertical movement for the upper shell 112 and the lid module 120. Each sealing member of the set of sealing members 131 is opened and placed one above other to in order to provide the necessary height adjustment. Further, the set of sealing members 131 also provides the sealing between the lower base shell 114 and the upper shell 112 or the lid module 120. Further, the lid module 120 is also provided with the stake hole series 130 to receive the support stakes 122. The number of sealing members 131 that are to be used may vary depending on the height adjustment required for the revolver 110 as the seedlings propagate and grow.

Referring to FIG. 26, the revolver 110 is disclosed which may be rotatable using the support stakes 122. The lid module 120 is provided with the support stakes 122 which are placed in the stake hole series 130 (can be seen in FIG. 25). The support stakes 122 enables rotation of the lid module 120 or the upper shell 112 independently of the lower base shell 112. In one embodiment, the support stakes 122 are connected to one or more external sources to enable the rotation of the lid module 120 or the upper shell 112. As the seedling propagate, one or more centrally located sprayers 315 of the plumbing system supply water into the lid module 120, the interior chamber 202, and the insert bucket 300 in which the roots of the seedlings propagate and rotate freely with the lid module 120. This allows the one or more centrally located sprayers 315 to not get blocked by the roots. The insert bucket 300, which does not rotate with the lid module 120, can be drained and removed allowing the roots to be grown into the lower base shell 114 and continue to rotate freely about the one or more centrally located sprayers 315 with the lid module 120.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

The invention claimed is:

1. An agricultural grow system for propagating seedlings, the grow system comprising:
a lower base shell;
an upper shell having a plurality of plant sites positioned about a lower edge of the upper shell;
a plurality of seedling inserts positioned in the plurality of plant sites of the upper shell; and
a plumbing system extending from the lower base shell to the upper shell, wherein the plumbing system comprises a spray line connected to a source of water and a spray head connected to the spray line, wherein the spray head is positioned to supply the water to the plurality of seedling inserts,
wherein the upper shell is provided with one or more stake hole series to receive one or more support stakes, and wherein the one or more support stakes enable at least one of vertical movement and rotational movement of the upper shell relative to the lower base shell.

2. The system of claim 1, wherein the spray line is a first spray line, wherein the spray head is a first spray head, and wherein the plumbing system further comprises a second spray line connected to the source of water and a second spray head connected to the second spray line.

3. The system of claim 2, wherein the first spray head and the second spray head are positioned within an interior chamber of the upper shell.

4. The system of claim 2, wherein the first spray head is positioned in the upper shell and the second spray head is positioned in the lower base shell, and wherein the first spray head and the second spray head are positioned on a common center axis of the upper shell and the lower base shell.

5. The system of claim 1, further comprises an insert bucket positionable within an interior chamber of the upper shell, wherein the insert bucket comprises a cylindrical wall, a closed bottom, and an open top, and wherein the cylindrical wall comprises slits extending downward from an upper edge of the insert bucket to define a maximum fill level in the insert bucket.

6. The system of claim 5, wherein the insert bucket comprises a bore channel that extends upward within the interior chamber, wherein the bore channel is configured to receive the spray line and the spray head, and wherein the insert bucket further comprises a plurality of partitions to allow individual roots of at least one seedling placed in each of the plurality of plant sites to propagate.

7. The system of claim 1, further comprises a dolly having a base and a plurality of wheels, wherein the dolly is placed below the lower base shell to move the agricultural grow system.

8. An agricultural grow system for propagating seedlings, the grow system comprising:
a revolver having an upper shell and a lower base shell, wherein the upper shell is removably resting on the lower base shell;
a containment cover positioned around the revolver;
a plurality of seedling inserts removably inserted into the revolver; and
a plumbing system placed in the revolver, wherein the plumbing system is configured to supply water to at least one seedling placed in each of the plurality of seedling inserts,
wherein the upper shell is provided with one or more stake hole series to receive one or more support stakes, and wherein the one or more support stakes enable at least one of vertical movement and rotational movement of the upper shell relative to the lower base shell.

9. The system of claim 8, wherein the revolver further comprises a lid module removably positioned on the upper shell, and wherein the lid module comprises at least one sleeve extending downward, and wherein the at least one sleeve is having at least one deflector plate.

10. The system of claim 9, wherein the at least one deflector plate is configured to deflect the water sprayed onto the at least one deflector plate using the plumbing system and direct the water to the at least one seedling.

11. The system of claim 8, wherein each of the plurality of the seedling inserts comprises a cylindrical body portion having a top portion, a side portion, and a bottom portion.

12. The system of claim 11, wherein the cylindrical body portion has a V-shaped notch, wherein the V-shaped notch extends at least through one of the top, side, and bottom portions of the cylindrical body portion, and wherein the cylindrical body portion further has a seedling hole at an apex of the V-shaped notch for receipt of the at least one seedling.

13. The system of claim 11, wherein the cylindrical body portion has a partial bore extending upward from the bottom portion to a seedling hole at a top of the partial bore, and wherein a shape of the partial bore is one of a conical, a cylindrical, an oval, a rectangular, and a square shape.

14. A revolver device of an agricultural grow system for propagating seedlings, the revolver device comprising:
    an upper shell;
    a lower base shell, wherein the upper shell is removably resting on the lower base shell; and
    a plurality of plant sites on the upper shell of the revolver, wherein the upper shell comprises a cylindrical body portion and a rectangular nose portion extending outwards from the cylindrical body portion, wherein the lower base shell comprises a bowl and a rectangular nose extending from the bowl,
    wherein the upper shell is provided with one or more stake hole series to receive one or more support stakes, and
    wherein the one or more support stakes enable at least one of vertical movement and rotational movement of the upper shell relative to the lower base shell.

15. The revolver device of claim 14, wherein the bowl is provided with a plurality of plant site troughs positioned below the plurality of plant sites.

16. The revolver device of claim 14, wherein the plurality of plant sites is a plurality of lower plant sites, and wherein each of the plurality of lower plant sites extends outward from a lower edge of the cylindrical body portion.

17. The revolver device of claim 14, further comprises a lid module removably attached to an upper edge of the cylindrical body portion of the upper shell, wherein the lid module is provided with a plurality of upper plant site.

18. The revolver device of claim 14, further comprises a sealing curtain extending around at least a portion of interiors of the upper shell and the lower base shell to provide a seal between the upper shell and the lower base shell.

* * * * *